US012591700B2

(12) United States Patent
Verma et al.

(10) Patent No.: US 12,591,700 B2
(45) Date of Patent: Mar. 31, 2026

(54) SYSTEMS AND METHODS FOR GENERATING CONSISTENT GLOBAL IDENTIFIERS WITHIN A DISTRIBUTED FILE SERVER ENVIRONMENT INCLUDING EXAMPLES OF GLOBAL IDENTIFIERS ACROSS DOMAINS

(71) Applicant: Nutanix, Inc., San Jose, CA (US)

(72) Inventors: Deepanshu Verma, Bengaluru (IN); Hemanth Kumar Thummala, San Jose, CA (US); Manoj Premanand Naik, San Jose, CA (US); Saji Kumar Vijaya Kumari Rajendran Nair, Cupertino, CA (US); Shilpa Krishnareddy, Bengaluru (IN)

(73) Assignee: Nutanix, Inc., San Jose, CA (US)

( * ) Notice: Subject to any disclaimer, the term of this patent is extended or adjusted under 35 U.S.C. 154(b) by 7 days.

(21) Appl. No.: 18/410,903

(22) Filed: Jan. 11, 2024

(65) Prior Publication Data

US 2025/0103738 A1    Mar. 27, 2025

(30) Foreign Application Priority Data

Sep. 27, 2023    (IN) ............................. 202311064851

(51) Int. Cl.
*G06F 21/62* (2013.01)
*G06F 16/188* (2019.01)
(52) U.S. Cl.
CPC ........ *G06F 21/6218* (2013.01); *G06F 16/188* (2019.01)
(58) Field of Classification Search
None
See application file for complete search history.

(56) References Cited

U.S. PATENT DOCUMENTS

| | | | |
|---|---|---|---|
| 5,276,867 A | 1/1994 | Kenley et al. | |
| 5,664,144 A | 9/1997 | Yanai et al. | |
| | | (Continued) | |

FOREIGN PATENT DOCUMENTS

| | | |
|---|---|---|
| CN | 103746997 A | 4/2014 |
| CN | 105100210 A | 11/2015 |
| | (Continued) | |

OTHER PUBLICATIONS

US 11,048,595 B2, 06/2021, Venkatesh et al. (withdrawn)
(Continued)

*Primary Examiner* — Brandon Hoffman
(74) *Attorney, Agent, or Firm* — Stoel Rives LLP

(57) ABSTRACT

Examples described herein are generally directed towards generating, allocating, and assigning consistent file server user identifiers (IDs) (also described herein as a global identifier (GID)) domains subscribed to by file server(s) within a distributed file server environment. In operation, a virtualized file server of a distributed file server system may scan for and identify a trusted domain subscribed to by the virtualized file server. The virtualized file server may allocate to the trusted domain a range of file server user IDs. The virtualized file server may store a mapping between local user security identifiers (SIDs) in the trusted domain and a respective file server user IDs within the allocated range. The virtualized file server may provide the mapping to a replication target, such as during a replication, migration, and/or a disaster recovery event.

35 Claims, 9 Drawing Sheets

(56)          References Cited

U.S. PATENT DOCUMENTS

| | | | |
|---|---|---|---|
| 5,870,555 A | 2/1999 | Pruett et al. |
| 5,873,085 A | 2/1999 | Enoki et al. |
| 5,924,096 A | 7/1999 | Draper et al. |
| 6,044,367 A | 3/2000 | Wolff |
| 6,055,543 A | 4/2000 | Christensen et al. |
| 6,085,234 A | 7/2000 | Pitts et al. |
| 6,101,508 A | 8/2000 | Wolff |
| 6,212,531 B1 | 4/2001 | Blea et al. |
| 6,289,356 B1 | 9/2001 | Hitz et al. |
| 6,341,340 B1 | 1/2002 | Tsukerman et al. |
| 6,442,602 B1 | 8/2002 | Choudhry |
| 6,539,381 B1 | 3/2003 | Prasad et al. |
| 6,694,447 B1 | 2/2004 | Leach et al. |
| 6,963,914 B1 | 11/2005 | Breitbart et al. |
| 6,968,345 B1 | 11/2005 | Muhlestein |
| 7,120,631 B1 | 10/2006 | Vahalia et al. |
| 7,159,056 B2 | 1/2007 | Goldick |
| 7,162,467 B2 | 1/2007 | Eshleman et al. |
| 7,356,679 B1 | 4/2008 | Le et al. |
| 7,366,738 B2 | 4/2008 | Yorke et al. |
| 7,409,511 B2 | 8/2008 | Edwards et al. |
| 7,606,868 B1 | 10/2009 | Le et al. |
| 7,702,843 B1 | 4/2010 | Chen et al. |
| 7,707,618 B1 | 4/2010 | Cox et al. |
| 7,725,671 B2 | 5/2010 | Prahlad et al. |
| 7,752,492 B1 | 7/2010 | Armangau et al. |
| 7,774,391 B1 | 8/2010 | Le et al. |
| 7,805,469 B1 | 9/2010 | Nagaralu et al. |
| 7,805,511 B1 | 9/2010 | Panicker et al. |
| 7,840,533 B2 | 11/2010 | Prahlad et al. |
| 7,890,529 B1 | 2/2011 | Srinivasan et al. |
| 7,937,453 B1 | 5/2011 | Hayden et al. |
| 8,095,810 B2 | 1/2012 | Matsuzawa et al. |
| 8,095,931 B1 | 1/2012 | Chen et al. |
| 8,112,661 B1 | 2/2012 | La et al. |
| 8,352,482 B2 | 1/2013 | Hansen |
| 8,352,608 B1 | 1/2013 | Keagy et al. |
| 8,359,594 B1 | 1/2013 | Davidson et al. |
| 8,365,167 B2 | 1/2013 | Beaty et al. |
| 8,407,448 B1 | 3/2013 | Hayden et al. |
| 8,447,728 B2 | 5/2013 | Prahlad et al. |
| 8,473,462 B1 | 6/2013 | Banerjee |
| 8,484,163 B1 | 7/2013 | Yucel et al. |
| 8,484,356 B1 | 7/2013 | Douglis et al. |
| 8,539,076 B2 | 9/2013 | Nakano et al. |
| 8,543,790 B2 | 9/2013 | Chen et al. |
| 8,549,518 B1 | 10/2013 | Aron et al. |
| 8,601,473 B1 | 12/2013 | Aron et al. |
| 8,635,351 B2 | 1/2014 | Astete et al. |
| 8,646,089 B2 | 2/2014 | Jayanthi et al. |
| 8,688,660 B1 | 4/2014 | Sivasubramanian et al. |
| 8,700,573 B2 | 4/2014 | Enko et al. |
| 8,719,522 B1 | 5/2014 | Chait et al. |
| 8,725,679 B2 | 5/2014 | Nair et al. |
| 8,751,515 B1 | 6/2014 | Xing et al. |
| 8,762,335 B2 | 6/2014 | Prahlad et al. |
| 8,805,951 B1 | 8/2014 | Faibish et al. |
| 8,838,923 B2 | 9/2014 | Prahlad et al. |
| 8,850,130 B1 | 9/2014 | Aron et al. |
| 8,863,124 B1 | 10/2014 | Aron |
| 8,909,753 B2 | 12/2014 | Nakamura et al. |
| 8,914,429 B2 | 12/2014 | Pitts |
| 8,935,563 B1 | 1/2015 | Rajaa et al. |
| 8,949,557 B2 | 2/2015 | Kamei et al. |
| 8,966,188 B1 | 2/2015 | Bardale |
| 8,983,952 B1 | 3/2015 | Zhang et al. |
| 8,996,783 B2 | 3/2015 | Huang et al. |
| 9,009,106 B1 | 4/2015 | Aron et al. |
| 9,043,567 B1 | 5/2015 | Modukuri et al. |
| 9,060,014 B2 | 6/2015 | Crowley |
| 9,069,708 B2 | 6/2015 | Gill et al. |
| 9,152,628 B1 | 10/2015 | Stacey et al. |
| 9,154,535 B1 | 10/2015 | Harris |
| 9,165,003 B1 | 10/2015 | Tummala et al. |
| 9,201,698 B2 | 12/2015 | Ashok et al. |
| 9,201,704 B2 | 12/2015 | Chang et al. |
| 9,201,887 B1 | 12/2015 | Earl et al. |
| 9,208,210 B2 | 12/2015 | Erofeev |
| 9,213,513 B2 | 12/2015 | Hartz et al. |
| 9,244,674 B2 | 1/2016 | Waterman et al. |
| 9,244,969 B1 | 1/2016 | Love et al. |
| 9,256,475 B1 | 2/2016 | Aron et al. |
| 9,256,612 B1 | 2/2016 | Bhatt et al. |
| 9,268,586 B2 | 2/2016 | Voccio et al. |
| 9,274,817 B1 | 3/2016 | Fan et al. |
| 9,286,298 B1 | 3/2016 | Gillett |
| 9,292,327 B1 | 3/2016 | Von Thenen et al. |
| 9,336,132 B1 | 5/2016 | Aron et al. |
| 9,348,702 B2 | 5/2016 | Hsu et al. |
| 9,405,566 B2 | 8/2016 | Chawla et al. |
| 9,411,628 B2 | 8/2016 | Bezbaruah et al. |
| 9,448,887 B1 | 9/2016 | Dayan et al. |
| 9,495,478 B2 | 11/2016 | Hendrickson et al. |
| 9,497,257 B1 | 11/2016 | Love et al. |
| 9,513,946 B2 | 12/2016 | Sevigny et al. |
| 9,519,596 B2 | 12/2016 | Coppola et al. |
| 9,535,907 B1 | 1/2017 | Stringham |
| 9,563,555 B2 | 2/2017 | Flynn et al. |
| 9,571,561 B2 | 2/2017 | Jang |
| 9,619,257 B1 | 4/2017 | Aron et al. |
| 9,634,990 B2 | 4/2017 | Lee |
| 9,639,428 B1 | 5/2017 | Boda et al. |
| 9,652,265 B1 | 5/2017 | Narayanasamy et al. |
| 9,658,899 B2 | 5/2017 | Jenkins |
| 9,690,670 B1 | 6/2017 | Paulzagade et al. |
| 9,733,958 B2 | 8/2017 | Cui et al. |
| 9,740,436 B2 | 8/2017 | Fiebrich-Kandler et al. |
| 9,740,472 B1 | 8/2017 | Sohi et al. |
| 9,740,723 B2 | 8/2017 | Prahlad et al. |
| 9,747,287 B1 | 8/2017 | Bhardwaj et al. |
| 9,772,866 B1 | 9/2017 | Aron et al. |
| 9,832,136 B1 | 11/2017 | Gibson |
| 9,846,706 B1 | 12/2017 | Basov et al. |
| 9,853,978 B2 | 12/2017 | Tellvik et al. |
| 9,870,291 B2 | 1/2018 | Bezbaruah et al. |
| 9,886,215 B1 | 2/2018 | Ramachandran et al. |
| 9,893,988 B2 | 2/2018 | Agarwal et al. |
| 9,940,154 B2 | 4/2018 | Ramani et al. |
| 9,946,573 B2 | 4/2018 | Mcdermott |
| 9,952,782 B1 | 4/2018 | Chandrasekaran et al. |
| 10,009,215 B1 | 6/2018 | Shorey |
| 10,050,862 B2 | 8/2018 | Nambiar et al. |
| 10,083,022 B2 | 9/2018 | Fukui et al. |
| 10,084,873 B2 | 9/2018 | Dornemann |
| 10,095,506 B2 | 10/2018 | Venkatesh et al. |
| 10,101,989 B2 | 10/2018 | Sinha et al. |
| 10,114,706 B1 | 10/2018 | Chougala et al. |
| 10,127,059 B2 | 11/2018 | Astete et al. |
| 10,140,115 B2 | 11/2018 | Fukui et al. |
| 10,152,233 B2 | 12/2018 | Xu et al. |
| 10,210,048 B2 | 2/2019 | Sancheti |
| 10,248,657 B2 | 4/2019 | Prahlad et al. |
| 10,310,953 B2 | 6/2019 | Vijayan et al. |
| 10,311,153 B2 | 6/2019 | Mason, Jr. et al. |
| 10,367,753 B2 | 7/2019 | Schultze et al. |
| 10,394,547 B2 | 8/2019 | Fukui et al. |
| 10,419,426 B2 | 9/2019 | Bakshan et al. |
| 10,484,894 B2 | 11/2019 | Gonzalez et al. |
| 10,523,592 B2 | 12/2019 | Byers et al. |
| 10,530,742 B2 | 1/2020 | Shah et al. |
| 10,540,164 B2 | 1/2020 | Bafna et al. |
| 10,540,165 B2 | 1/2020 | Bafna et al. |
| 10,540,166 B2 | 1/2020 | Arikatla et al. |
| 10,541,064 B2 | 1/2020 | Lee et al. |
| 10,594,730 B1 | 3/2020 | Summers et al. |
| 10,719,305 B2 | 7/2020 | Sinha et al. |
| 10,719,306 B2 | 7/2020 | Deshmukh et al. |
| 10,719,307 B2 | 7/2020 | Kanada et al. |
| 10,728,090 B2 | 7/2020 | Deshmukh et al. |
| 10,809,998 B2 | 10/2020 | Venkatesh et al. |
| 10,824,455 B2 | 11/2020 | Arikatla et al. |
| 10,831,465 B2 | 11/2020 | Sharpe et al. |
| 10,838,708 B2 | 11/2020 | Sinha et al. |
| 10,949,192 B2 | 3/2021 | Venkatesh et al. |

(56)                  References Cited

U.S. PATENT DOCUMENTS

| | | | |
|---|---|---|---|
| 11,025,626 | B1 | 6/2021 | Todd et al. |
| 11,086,826 | B2 | 8/2021 | Thummala et al. |
| 11,106,447 | B2 | 8/2021 | Gupta et al. |
| 11,281,484 | B2 | 3/2022 | Bafna et al. |
| 11,288,239 | B2 | 3/2022 | Bafna |
| 11,294,777 | B2 | 4/2022 | Venkatesh et al. |
| 11,347,601 | B1 | 5/2022 | Nachiappan et al. |
| 12,117,972 | B2 | 10/2024 | Gopalapura Venkatesh et al. |
| 12,153,690 | B2 | 11/2024 | Thummala et al. |
| 12,164,383 | B2 | 12/2024 | Rathi et al. |
| 12,189,499 | B2 | 1/2025 | Wang et al. |
| 2001/0047400 | A1 | 11/2001 | Coates et al. |
| 2002/0069196 | A1 | 6/2002 | Betros et al. |
| 2002/0120763 | A1 | 8/2002 | Miloushev et al. |
| 2003/0014442 | A1 | 1/2003 | Shiigi et al. |
| 2003/0018784 | A1* | 1/2003 | Lette ................. H04L 67/1095 |
| | | | 709/217 |
| 2003/0115218 | A1 | 6/2003 | Bobbitt et al. |
| 2003/0163597 | A1 | 8/2003 | Hellman et al. |
| 2003/0195942 | A1 | 10/2003 | Muhlestein et al. |
| 2004/0054777 | A1 | 3/2004 | Ackaouy et al. |
| 2004/0199734 | A1 | 10/2004 | Rajamani et al. |
| 2004/0210591 | A1 | 10/2004 | Hirschfeld et al. |
| 2004/0225742 | A1 | 11/2004 | Loaiza et al. |
| 2004/0267832 | A1 | 12/2004 | Wong et al. |
| 2005/0120160 | A1 | 6/2005 | Plouffe et al. |
| 2005/0120180 | A1 | 6/2005 | Schornbach et al. |
| 2005/0125503 | A1 | 6/2005 | Iyengar et al. |
| 2005/0193221 | A1 | 9/2005 | Yoneyama |
| 2005/0193245 | A1 | 9/2005 | Hayden et al. |
| 2005/0226059 | A1 | 10/2005 | Kavuri et al. |
| 2005/0228798 | A1 | 10/2005 | Shepard et al. |
| 2006/0010227 | A1 | 1/2006 | Atluri |
| 2006/0047685 | A1 | 3/2006 | Dearing et al. |
| 2006/0080445 | A1 | 4/2006 | Chang et al. |
| 2006/0167921 | A1 | 7/2006 | Grebus et al. |
| 2006/0206901 | A1 | 9/2006 | Chan |
| 2006/0224918 | A1 | 10/2006 | Koike |
| 2006/0225065 | A1 | 10/2006 | Chandhok et al. |
| 2006/0271510 | A1 | 11/2006 | Harward et al. |
| 2006/0271931 | A1 | 11/2006 | Harris et al. |
| 2007/0022129 | A1 | 1/2007 | Bahar et al. |
| 2007/0038913 | A1 | 2/2007 | Allen et al. |
| 2007/0100905 | A1 | 5/2007 | Masters et al. |
| 2007/0171921 | A1 | 7/2007 | Wookey et al. |
| 2007/0179991 | A1 | 8/2007 | Burnett et al. |
| 2007/0179995 | A1 | 8/2007 | Prahlad et al. |
| 2007/0300220 | A1 | 12/2007 | Seliger et al. |
| 2008/0040483 | A1 | 2/2008 | Nakatani et al. |
| 2008/0071997 | A1 | 3/2008 | Loaiza et al. |
| 2008/0098194 | A1 | 4/2008 | Hashimoto et al. |
| 2008/0104349 | A1 | 5/2008 | Maruyama et al. |
| 2008/0104589 | A1 | 5/2008 | Mccrory et al. |
| 2008/0114854 | A1 | 5/2008 | Wong et al. |
| 2008/0133486 | A1 | 6/2008 | Fitzgerald et al. |
| 2008/0134178 | A1 | 6/2008 | Fitzgerald et al. |
| 2008/0189468 | A1 | 8/2008 | Schmidt et al. |
| 2008/0201414 | A1 | 8/2008 | Amir et al. |
| 2008/0201457 | A1 | 8/2008 | London |
| 2008/0229142 | A1 | 9/2008 | Anand et al. |
| 2008/0263113 | A1 | 10/2008 | Krishnaiyer et al. |
| 2008/0270677 | A1 | 10/2008 | Kolakowski |
| 2008/0320499 | A1 | 12/2008 | Suit |
| 2008/0320583 | A1 | 12/2008 | Sharma et al. |
| 2009/0006801 | A1 | 1/2009 | Shultz et al. |
| 2009/0100248 | A1 | 4/2009 | Kami |
| 2009/0150885 | A1 | 6/2009 | Safari et al. |
| 2009/0158082 | A1 | 6/2009 | Jain et al. |
| 2009/0171971 | A1 | 7/2009 | Goddard et al. |
| 2009/0193272 | A1 | 7/2009 | Matsuzawa et al. |
| 2009/0216975 | A1 | 8/2009 | Halperin et al. |
| 2009/0248870 | A1 | 10/2009 | Kamei et al. |
| 2009/0249470 | A1 | 10/2009 | Litvin et al. |
| 2009/0254572 | A1 | 10/2009 | Redlich et al. |
| 2009/0271412 | A1 | 10/2009 | Lacapra et al. |
| 2009/0287887 | A1 | 11/2009 | Matsuki et al. |
| 2009/0288084 | A1 | 11/2009 | Astete et al. |
| 2010/0023521 | A1 | 1/2010 | Arcese et al. |
| 2010/0070725 | A1 | 3/2010 | Prahlad et al. |
| 2010/0082716 | A1 | 4/2010 | Agetsuma et al. |
| 2010/0082774 | A1 | 4/2010 | Pitts |
| 2010/0095289 | A1 | 4/2010 | Nguyen et al. |
| 2010/0138921 | A1 | 6/2010 | Na et al. |
| 2010/0174745 | A1 | 7/2010 | Ryan et al. |
| 2010/0214908 | A1 | 8/2010 | Ralev |
| 2010/0241785 | A1 | 9/2010 | Chen et al. |
| 2010/0250824 | A1 | 9/2010 | Belay |
| 2010/0275205 | A1 | 10/2010 | Nakajima |
| 2011/0022694 | A1 | 1/2011 | Dalal et al. |
| 2011/0022695 | A1 | 1/2011 | Dalal et al. |
| 2011/0022812 | A1 | 1/2011 | Van et al. |
| 2011/0022883 | A1 | 1/2011 | Hansen |
| 2011/0047340 | A1 | 2/2011 | Olson et al. |
| 2011/0078318 | A1 | 3/2011 | Desai et al. |
| 2011/0119668 | A1 | 5/2011 | Calder et al. |
| 2011/0119763 | A1 | 5/2011 | Wade et al. |
| 2011/0125835 | A1 | 5/2011 | Soltis |
| 2011/0137879 | A1 | 6/2011 | Dubey et al. |
| 2011/0161299 | A1 | 6/2011 | Prahlad et al. |
| 2011/0179414 | A1 | 7/2011 | Goggin et al. |
| 2011/0184993 | A1 | 7/2011 | Chawla et al. |
| 2011/0185292 | A1 | 7/2011 | Chawla et al. |
| 2011/0225574 | A1 | 9/2011 | Khalidi et al. |
| 2011/0239213 | A1 | 9/2011 | Aswani et al. |
| 2011/0251992 | A1 | 10/2011 | Bethlehem et al. |
| 2011/0252208 | A1 | 10/2011 | Ali et al. |
| 2011/0255538 | A1 | 10/2011 | Srinivasan et al. |
| 2011/0265076 | A1 | 10/2011 | Thorat et al. |
| 2011/0271279 | A1 | 11/2011 | Pate |
| 2011/0276578 | A1 | 11/2011 | Allalouf et al. |
| 2011/0276963 | A1 | 11/2011 | Wu et al. |
| 2011/0283277 | A1 | 11/2011 | Castillo et al. |
| 2011/0289561 | A1 | 11/2011 | Ivanov et al. |
| 2011/0307729 | A1 | 12/2011 | Matsuzawa et al. |
| 2011/0320690 | A1 | 12/2011 | Petersen et al. |
| 2012/0017114 | A1 | 1/2012 | Timashev et al. |
| 2012/0023495 | A1 | 1/2012 | Machida |
| 2012/0030456 | A1 | 2/2012 | Wu et al. |
| 2012/0054736 | A1 | 3/2012 | Arcese et al. |
| 2012/0081395 | A1 | 4/2012 | Adi et al. |
| 2012/0084381 | A1 | 4/2012 | Alladi et al. |
| 2012/0166866 | A1 | 6/2012 | Rao et al. |
| 2012/0209983 | A1 | 8/2012 | Bronner et al. |
| 2012/0233463 | A1 | 9/2012 | Holt et al. |
| 2012/0254445 | A1 | 10/2012 | Kawamoto et al. |
| 2012/0254567 | A1 | 10/2012 | Umbehocker |
| 2012/0266162 | A1 | 10/2012 | Baron |
| 2012/0272237 | A1 | 10/2012 | Baron |
| 2012/0290630 | A1 | 11/2012 | Aizman et al. |
| 2012/0304247 | A1 | 11/2012 | Badger et al. |
| 2012/0310881 | A1 | 12/2012 | Shadmon |
| 2012/0310892 | A1 | 12/2012 | Dam et al. |
| 2012/0324183 | A1 | 12/2012 | Chiruvolu et al. |
| 2013/0046740 | A1 | 2/2013 | Li et al. |
| 2013/0047160 | A1 | 2/2013 | Conover |
| 2013/0055018 | A1 | 2/2013 | Joshi et al. |
| 2013/0061110 | A1 | 3/2013 | Zvibel |
| 2013/0061167 | A1 | 3/2013 | Rhodes et al. |
| 2013/0066930 | A1 | 3/2013 | Kamei et al. |
| 2013/0117744 | A1 | 5/2013 | Klein et al. |
| 2013/0132674 | A1 | 5/2013 | Sundrani |
| 2013/0144921 | A1 | 6/2013 | Nakamura et al. |
| 2013/0151888 | A1 | 6/2013 | Bhattiprolu et al. |
| 2013/0152085 | A1 | 6/2013 | D'Amore et al. |
| 2013/0185716 | A1 | 7/2013 | Yin et al. |
| 2013/0198738 | A1 | 8/2013 | Reddin et al. |
| 2013/0212345 | A1 | 8/2013 | Nakajima |
| 2013/0227379 | A1 | 8/2013 | Gupta et al. |
| 2013/0227552 | A1 | 8/2013 | Reddin et al. |
| 2013/0227566 | A1 | 8/2013 | Higuchi et al. |
| 2013/0232491 | A1 | 9/2013 | Radhakrishnan et al. |
| 2013/0246705 | A1 | 9/2013 | Diare |
| 2013/0247036 | A1 | 9/2013 | Fujiwara |
| 2013/0262396 | A1 | 10/2013 | Kripalani et al. |

(56) References Cited

U.S. PATENT DOCUMENTS

| | | | |
|---|---|---|---|
| 2013/0283267 A1 | 10/2013 | Cooper et al. |
| 2013/0297869 A1 | 11/2013 | Mills et al. |
| 2013/0318229 A1 | 11/2013 | Bakre et al. |
| 2014/0006708 A1 | 1/2014 | Huynh et al. |
| 2014/0013398 A1 | 1/2014 | Hotti |
| 2014/0025796 A1 | 1/2014 | Vibhor et al. |
| 2014/0059392 A1 | 2/2014 | Ren et al. |
| 2014/0095544 A1 | 4/2014 | Eshel et al. |
| 2014/0095555 A1 | 4/2014 | Kim et al. |
| 2014/0095816 A1 | 4/2014 | Hsu et al. |
| 2014/0108587 A1 | 4/2014 | Goldberg et al. |
| 2014/0115182 A1 | 4/2014 | Sabaa et al. |
| 2014/0122547 A1 | 5/2014 | Agetsuma et al. |
| 2014/0123138 A1 | 5/2014 | Lee et al. |
| 2014/0146055 A1 | 5/2014 | Bala et al. |
| 2014/0149794 A1 | 5/2014 | Shetty et al. |
| 2014/0149983 A1 | 5/2014 | Bonilla et al. |
| 2014/0173199 A1 | 6/2014 | Gupta et al. |
| 2014/0181116 A1 | 6/2014 | Wang |
| 2014/0188808 A1 | 7/2014 | Wolf et al. |
| 2014/0189429 A1 | 7/2014 | Gill et al. |
| 2014/0189677 A1 | 7/2014 | Curzi et al. |
| 2014/0189685 A1 | 7/2014 | Kripalani |
| 2014/0189686 A1 | 7/2014 | Masters et al. |
| 2014/0196038 A1 | 7/2014 | Kottomtharayil et al. |
| 2014/0201725 A1 | 7/2014 | Tian et al. |
| 2014/0207824 A1 | 7/2014 | Brandwine et al. |
| 2014/0230024 A1 | 8/2014 | Uehara et al. |
| 2014/0237464 A1 | 8/2014 | Waterman et al. |
| 2014/0250300 A1 | 9/2014 | Runkis et al. |
| 2014/0279909 A1 | 9/2014 | Sudarsanam et al. |
| 2014/0298185 A1 | 10/2014 | Chen et al. |
| 2014/0310710 A1 | 10/2014 | Lubsey et al. |
| 2014/0359612 A1 | 12/2014 | D'Amato et al. |
| 2014/0365811 A1 | 12/2014 | Veiga et al. |
| 2015/0006707 A1 | 1/2015 | Malik et al. |
| 2015/0006788 A1 | 1/2015 | Liu et al. |
| 2015/0007180 A1 | 1/2015 | Sharp et al. |
| 2015/0026682 A1 | 1/2015 | Singh et al. |
| 2015/0032690 A1 | 1/2015 | Hoque et al. |
| 2015/0039735 A1 | 2/2015 | Zeyliger et al. |
| 2015/0039837 A1 | 2/2015 | Quan et al. |
| 2015/0081644 A1 | 3/2015 | Pitts |
| 2015/0095788 A1 | 4/2015 | Thiele et al. |
| 2015/0096011 A1 | 4/2015 | Watt |
| 2015/0106802 A1 | 4/2015 | Ivanov et al. |
| 2015/0142745 A1 | 5/2015 | Tekade et al. |
| 2015/0142747 A1 | 5/2015 | Zou |
| 2015/0143164 A1 | 5/2015 | Veerla et al. |
| 2015/0172412 A1 | 6/2015 | Escriva et al. |
| 2015/0178019 A1 | 6/2015 | Hegdal et al. |
| 2015/0205639 A1 | 7/2015 | Matsumoto et al. |
| 2015/0213032 A1 | 7/2015 | Powell et al. |
| 2015/0215389 A1 | 7/2015 | Spencer |
| 2015/0220324 A1 | 8/2015 | Arcese et al. |
| 2015/0242291 A1 | 8/2015 | Chang et al. |
| 2015/0278046 A1 | 10/2015 | Zellermayer et al. |
| 2015/0293830 A1 | 10/2015 | Bhide et al. |
| 2015/0293896 A1 | 10/2015 | Runkis et al. |
| 2015/0301903 A1 | 10/2015 | Mutha et al. |
| 2015/0309891 A1 | 10/2015 | Saika |
| 2015/0324217 A1 | 11/2015 | Shilmover et al. |
| 2015/0326531 A1 | 11/2015 | Cui et al. |
| 2015/0331757 A1 | 11/2015 | Durge et al. |
| 2015/0355862 A1 | 12/2015 | Hayes et al. |
| 2015/0378761 A1 | 12/2015 | Sevigny et al. |
| 2015/0378853 A1 | 12/2015 | Sevigny et al. |
| 2016/0004693 A1 | 1/2016 | Chen et al. |
| 2016/0011898 A1 | 1/2016 | Lee et al. |
| 2016/0070492 A1 | 3/2016 | Cherubini et al. |
| 2016/0077988 A1 | 3/2016 | Tipton et al. |
| 2016/0078068 A1 | 3/2016 | Agrawal et al. |
| 2016/0085480 A1 | 3/2016 | Chiu et al. |
| 2016/0085574 A1 | 3/2016 | Dornemann et al. |
| 2016/0087861 A1 | 3/2016 | Kuan et al. |
| 2016/0110214 A1 | 4/2016 | Vincent et al. |
| 2016/0110267 A1 | 4/2016 | Earl et al. |
| 2016/0124665 A1 | 5/2016 | Jain et al. |
| 2016/0162371 A1 | 6/2016 | Prabhu et al. |
| 2016/0171241 A1 | 6/2016 | Yun |
| 2016/0179416 A1 | 6/2016 | Mutha et al. |
| 2016/0179419 A1 | 6/2016 | Yamaguchi et al. |
| 2016/0188232 A1 | 6/2016 | Ramachandran et al. |
| 2016/0188407 A1 | 6/2016 | Bronnikov et al. |
| 2016/0202916 A1 | 7/2016 | Cui et al. |
| 2016/0203008 A1 | 7/2016 | Cui et al. |
| 2016/0216993 A1 | 7/2016 | Beckwith et al. |
| 2016/0224363 A1 | 8/2016 | Joy |
| 2016/0274926 A1 | 9/2016 | Narasimhamurthy et al. |
| 2016/0301766 A1 | 10/2016 | Ionescu et al. |
| 2016/0316003 A1 | 10/2016 | Snider et al. |
| 2016/0328226 A1 | 11/2016 | Arya et al. |
| 2016/0335108 A1 | 11/2016 | Ryu et al. |
| 2016/0335134 A1 | 11/2016 | Gupta et al. |
| 2016/0359697 A1 | 12/2016 | Scheib et al. |
| 2016/0378528 A1 | 12/2016 | Zamir |
| 2016/0378616 A1 | 12/2016 | Wigmore et al. |
| 2017/0004131 A1 | 1/2017 | Ben Dayan et al. |
| 2017/0005990 A1 | 1/2017 | Birger et al. |
| 2017/0012904 A1 | 1/2017 | Matzek et al. |
| 2017/0024152 A1 | 1/2017 | Bhagi et al. |
| 2017/0024224 A1 | 1/2017 | Bakke et al. |
| 2017/0039078 A1 | 2/2017 | Chen et al. |
| 2017/0039218 A1 | 2/2017 | Prahlad et al. |
| 2017/0048223 A1 | 2/2017 | Anantha Padmanaban et al. |
| 2017/0068469 A1 | 3/2017 | Shankar et al. |
| 2017/0075921 A1 | 3/2017 | Benton et al. |
| 2017/0090776 A1 | 3/2017 | Kowles |
| 2017/0091047 A1 | 3/2017 | Bangalore et al. |
| 2017/0109184 A1 | 4/2017 | Ramani et al. |
| 2017/0149886 A1 | 5/2017 | Shetty |
| 2017/0160983 A1 | 6/2017 | Fiske et al. |
| 2017/0177638 A1 | 6/2017 | Bhosale et al. |
| 2017/0193021 A1 | 7/2017 | Deng et al. |
| 2017/0206074 A1 | 7/2017 | Arcese et al. |
| 2017/0206207 A1 | 7/2017 | Bondurant et al. |
| 2017/0220661 A1 | 8/2017 | Cao et al. |
| 2017/0228300 A1 | 8/2017 | Thomas et al. |
| 2017/0235507 A1 | 8/2017 | Sinha et al. |
| 2017/0235562 A1 | 8/2017 | Bafna et al. |
| 2017/0235563 A1 | 8/2017 | Bafna et al. |
| 2017/0235589 A1 | 8/2017 | Gopalapura Venkatesh et al. |
| 2017/0235590 A1 | 8/2017 | Sinha et al. |
| 2017/0235591 A1 | 8/2017 | Kanada et al. |
| 2017/0235653 A1 | 8/2017 | Arikatla et al. |
| 2017/0235654 A1 | 8/2017 | Deshmukh et al. |
| 2017/0235751 A1 | 8/2017 | Gupta et al. |
| 2017/0235758 A1 | 8/2017 | Gopalapura Venkatesh et al. |
| 2017/0235760 A1 | 8/2017 | Sharpe et al. |
| 2017/0235761 A1 | 8/2017 | Bafna et al. |
| 2017/0235762 A1 | 8/2017 | Sharpe et al. |
| 2017/0235763 A1 | 8/2017 | Ventatesh et al. |
| 2017/0235764 A1 | 8/2017 | Sharpe et al. |
| 2017/0235950 A1 | 8/2017 | Gopalapura Venkatesh et al. |
| 2017/0242599 A1 | 8/2017 | Patnaik et al. |
| 2017/0262346 A1 | 9/2017 | Pradhan et al. |
| 2017/0262347 A1 | 9/2017 | Dornemann |
| 2017/0264684 A1 | 9/2017 | Spillane et al. |
| 2017/0277556 A1 | 9/2017 | Ishii et al. |
| 2017/0277903 A1 | 9/2017 | Christodorescu et al. |
| 2017/0279674 A1 | 9/2017 | Zhu |
| 2017/0286228 A1 | 10/2017 | Redko et al. |
| 2017/0302589 A1 | 10/2017 | Leafe et al. |
| 2017/0302731 A1 | 10/2017 | Cui |
| 2018/0004766 A1 | 1/2018 | Darling |
| 2018/0011766 A1 | 1/2018 | Lee et al. |
| 2018/0062993 A1 | 3/2018 | Wu et al. |
| 2018/0113623 A1 | 4/2018 | Sancheti |
| 2018/0129426 A1 | 5/2018 | Aron et al. |
| 2018/0143845 A1 | 5/2018 | Chawla et al. |
| 2018/0143880 A1 | 5/2018 | Dornemann |
| 2018/0145960 A1 | 5/2018 | Bakshan et al. |
| 2018/0157521 A1 | 6/2018 | Arikatla et al. |
| 2018/0157522 A1 | 6/2018 | Bafna et al. |

(56) References Cited

U.S. PATENT DOCUMENTS

| | | |
|---|---|---|
| 2018/0157561 A1 | 6/2018 | Venkatesh et al. |
| 2018/0157677 A1 | 6/2018 | Bafna et al. |
| 2018/0157752 A1 | 6/2018 | Arikatla et al. |
| 2018/0157860 A1 | 6/2018 | Nair et al. |
| 2018/0159729 A1 | 6/2018 | Deshmukh et al. |
| 2018/0159826 A1 | 6/2018 | Yisan et al. |
| 2018/0173731 A1 | 6/2018 | Nazari et al. |
| 2018/0196719 A1 | 7/2018 | Glass |
| 2018/0205787 A1 | 7/2018 | Ben Dayan et al. |
| 2018/0278602 A1 | 9/2018 | Koushik et al. |
| 2018/0332105 A1 | 11/2018 | Huang et al. |
| 2018/0357251 A1 | 12/2018 | Kumarasamy et al. |
| 2019/0026101 A1 | 1/2019 | Venkatesh et al. |
| 2019/0034240 A1 | 1/2019 | Nabi et al. |
| 2019/0079747 A1 | 3/2019 | Sinha et al. |
| 2019/0129807 A1 | 5/2019 | Zhang |
| 2019/0129808 A1 | 5/2019 | Acharya et al. |
| 2019/0179918 A1 | 6/2019 | Singh et al. |
| 2019/0196718 A1 | 6/2019 | Pai et al. |
| 2019/0207925 A1 | 7/2019 | Anantha Padmanaban et al. |
| 2019/0228147 A1 | 7/2019 | Formato et al. |
| 2019/0243703 A1 | 8/2019 | Rooney et al. |
| 2019/0332683 A1 | 10/2019 | Thummala et al. |
| 2019/0339883 A1 | 11/2019 | Aron et al. |
| 2020/0004424 A1 | 1/2020 | Khan et al. |
| 2020/0004641 A1 | 1/2020 | Singhal et al. |
| 2020/0007530 A1 | 1/2020 | Mohamad Abdul et al. |
| 2020/0034069 A1 | 1/2020 | Batra et al. |
| 2020/0036647 A1 | 1/2020 | Gupta et al. |
| 2020/0081704 A1 | 3/2020 | Bafna et al. |
| 2020/0081733 A1 | 3/2020 | Buck et al. |
| 2020/0106669 A1 | 4/2020 | Dhillon et al. |
| 2020/0125580 A1 | 4/2020 | Shao |
| 2020/0137157 A1 | 4/2020 | Joseph et al. |
| 2020/0162551 A1 | 5/2020 | Vijayan et al. |
| 2020/0193059 A1 | 6/2020 | Narayanswamy et al. |
| 2020/0274869 A1 | 8/2020 | Tahenakos et al. |
| 2021/0004454 A1* | 1/2021 | Chester ................. H04L 9/3213 |
| 2021/0049074 A1 | 2/2021 | Bezerra Maimoni et al. |
| 2021/0049079 A1 | 2/2021 | Kumar et al. |
| 2021/0141630 A1 | 5/2021 | Sharpe et al. |
| 2021/0157690 A1 | 5/2021 | Wexler et al. |
| 2021/0200641 A1 | 7/2021 | Bafna et al. |
| 2021/0224233 A1 | 7/2021 | Bafna et al. |
| 2021/0247973 A1 | 8/2021 | Gupta et al. |
| 2021/0318132 A1* | 10/2021 | Simpson ............... G06F 3/0346 |
| 2021/0318938 A1 | 10/2021 | Benke et al. |
| 2021/0326358 A1 | 10/2021 | Seelemann, II et al. |
| 2021/0334178 A1 | 10/2021 | Yang et al. |
| 2021/0342237 A1 | 11/2021 | Polimera et al. |
| 2021/0344772 A1 | 11/2021 | Arikatla et al. |
| 2021/0349859 A1 | 11/2021 | Bafna et al. |
| 2021/0365257 A1 | 11/2021 | Venkatesh et al. |
| 2021/0373815 A1 | 12/2021 | Kumar et al. |
| 2021/0390080 A1 | 12/2021 | Tripathi et al. |
| 2021/0397587 A1 | 12/2021 | Thummala et al. |
| 2021/0406136 A1 | 12/2021 | Venkatesh et al. |
| 2022/0004377 A1 | 1/2022 | Sharpe et al. |
| 2022/0012208 A1 | 1/2022 | Singhal et al. |
| 2022/0091947 A1 | 3/2022 | Kothari et al. |
| 2022/0147342 A1 | 5/2022 | Sharpe et al. |
| 2022/0147495 A1 | 5/2022 | Sharpe et al. |
| 2022/0156107 A1 | 5/2022 | Bafna et al. |
| 2022/0283708 A1 | 9/2022 | Grunwald et al. |
| 2022/0292002 A1 | 9/2022 | Kumar et al. |
| 2022/0300335 A1 | 9/2022 | Venkatesh et al. |
| 2023/0056217 A1 | 2/2023 | Rathi et al. |
| 2023/0056425 A1 | 2/2023 | Gopalapura et al. |
| 2023/0066137 A1 | 3/2023 | Vijapurapu et al. |
| 2023/0068262 A1 | 3/2023 | Bafna et al. |
| 2023/0082186 A1 | 3/2023 | Balcha et al. |
| 2023/0101337 A1 | 3/2023 | Ahmad et al. |
| 2023/0237022 A1 | 7/2023 | Thomas et al. |
| 2023/0237170 A1 | 7/2023 | Thummala et al. |
| 2023/0267053 A1 | 8/2023 | Khanna et al. |
| 2024/0045774 A1 | 2/2024 | Wang et al. |
| 2024/0070032 A1 | 2/2024 | Wang et al. |
| 2025/0265156 A1 | 8/2025 | Rathi et al. |

FOREIGN PATENT DOCUMENTS

| | | |
|---|---|---|
| CN | 110516005 A | 11/2019 |
| CN | 110519112 A | 11/2019 |
| CN | 110569269 A | 12/2019 |
| EP | 1062581 B1 | 10/2003 |
| EP | 1214663 B1 | 6/2006 |
| EP | 1979814 A2 | 10/2008 |
| WO | 2010050944 A1 | 5/2010 |
| WO | 2012126177 A2 | 9/2012 |
| WO | 2016018446 A1 | 2/2016 |
| WO | 2018014650 A1 | 1/2018 |

OTHER PUBLICATIONS

[Published as US-2021-0349859-A1] U.S. Appl. No. 17/238,001 titled "Cloning Virtualized File Servers", filed Apr. 22, 2021.

[Published as US-2021-0365257-A1] U.S. Appl. No. 17/169,137 titled "Virtualized File Server Data Sharing", filed Feb. 5, 2021.

[Published as US-2021-0397587-A1] U.S. Appl. No. 17/364,453 titled "Virtualized Server Systems and Methods Including Domain Joining Techniques", filed Jun. 30, 2021.

[Published as US-2021-0406136-A1] U.S. Appl. No. 17/302,343 titled "Disaster Recovery for Distributed File Servers, Including Metadata Fixers", filed Apr. 30, 2021.

U.S. Appl. No. 18/830,486 titled "File Server Managers and Systems for Managing Virtualized File Servers", filed Sep. 10, 2024.

U.S. Appl. No. 18/970,664 titled "Failover and Failback of Distributed File Servers", filed Dec. 5, 2024.

[Published as US-2021-0390080-A1] U.S. Appl. No. 16/944,323 titled "Actions Based on File Tagging in a Distributed File Server Virtual Machine (FSVM) Environment", filed Jul. 31, 2020, pp. all.

Poitras, Stevens , et al., "The Nutanix Bible", https://nutanixbible.com, May 21, 2024, pp. 268.

Isilon OneFS, Version 8.0.1; Web Administration Guide, Oct. 2016.

Dell EMC; Dell EMC Isilon OneFS Operating System; Scale-out NAS to maximize the data capital and business value of your unstructured data, 2020, pp. all.

Dell EMC; White Paper; Dell EMC Isilon ONEFS Operating System; Powering the Isilon Scale-Out Storage Platform, Dec. 2019, pp. all.

"Administering VMware vSAN—VMware vSphere 7.0", Update 1; docs.vmware.com/en/VMware-vSphere/7.0/vsan-701-administration-guide.pdf, 2015-2020, pp. 1-114.

"Architecture for Continuous Replication", Commvault, May 7, 2020, pp. 1-4.

"Backup vSAN 7 File Share with Veeam Backup & Replication 10", Sysadmin Stories, https://www.sysadminstories.com/2020/06/backup-vsan-7-file-share-with-veeam.html, Jun. 2, 2020, pp. 1-7.

"Best practices for disaster recovery with Azure File Sync", Microsoft Docs https://docs.microsoft.com/en-us/azure/storage/file-sync/file-sync-disaster-recovery-best-practices, Retrieved Jun. 1, 2022, pp. 1-6.

"Carbonite Availability for Windows User's Guide Version 8.1.0", Carbonite, Inc. (United States), Feb. 27, 2018, pp. 1-391.

"Characteristics of a vSAN Cluster", VMWare Docs; retrieved from: https://docs.vmware.com/en/VMware-vSphere/7.0/com.vmware.vsphere.vsan-planning.doc/GUID-C0818534-7B96-43E4-93BB-7955449852DE.html, May 31, 2019, pp. 1-2.

"Clustered Data Ontap 8.2 File Access Management Guide for CIFS", NetApp; (year 2014), Feb. 2014, pp. all.

"Common Tasks—Remote Replication", Arcserve https://support.storagecraft/com/s/article/common-tasks-remote-replication-ox?language=en_US, Oct. 20, 2021, pp. 1-11.

"Data Restore Using Restore Portal", Veeam | Microsoft 365, February Feb. 25, 2022, pp. 1.

"Designing and Sizing Virtual SAN Fault Domains", Administering VMware Virtual SAN; VMware vSphere 6.5; vSAN 6.6; https://

(56)        References Cited

OTHER PUBLICATIONS docs.vmware.com/en/VMware-vSphere/6.5/virtual-san-66-administration-guide.pdf, captured Aug. 20, 2021, 2017, pp. 34.
"DFS Namespaces and DFS Replication Overview", Microsoft Learn, Aug. 31, 2016, pp. 9.
"DFS Namespaces Overview", Microsoft Learn, Jan. 5, 2023, pp. 6.
"Disaster Recovery of Workloads on AWS: Recovery in the Cloud", AWS, Feb. 12, 2021, pp. 1-33.
"EMC Isilon OneFS Operating System; Powering scale-out storage for the new world of Big Data in the enterprise", www.EMC.com, Feb. 2020, pp. all.
"Enabling or disabling SMB automatic node referrals", NetApp https://docs.netapp.com/ontap-9/index.jsp?topic=%2Fcom.netapp.doc.cdot-famg-cifs%2FGUID-AC7E8515-3A4C-4BB5-A8C8-38B565C952E0.html, Sep. 19, 2019, pp. all.
"End User Access", Commvault, 2019, pp. 1-4.
"Enterprise file shares with disaster recovery", Microsoft Docs https://docs.microsoft.com/en-us/azure/architecture/example-scenario/file-storage/enterprise-file-shares-disaster-recovery, Retrieved May 31, 2022, pp. 1-6.
"General Share Properties", Oracle ZFS Storage Application Administration Guide, 2013, pp. 1-5.
"Guaranteeing throughput with QoS", NetApp https://docs.netapp.com/ontap-9/index.jsp?topic=%2Fcom.netapp.doc.pow-perf-mon%2FGUID-77DF9BAF-4ED7-43F6-AECE-95DFB0680D2F.html, Sep. 19, 2019, pp. all.
"High Availability and Data Protection With Dell EMC Isilon Scale-Out NAS", Dell: Dell Inc., Jul. 2018, pp. all.
"How to troubleshoot the 'Autolocation' feature in Clustered Data ONTAP", NetApp https://kb.netapp.com/app/answers/answer_view/a_id/1030857/loc/en_US#_highlight, Sep. 19, 2019, pp. all.
"How to Troubleshoot the 'Autolocation' feature in Clustered Data ONTAP—Results", NetApp https://kb.netapp.com/app/results/kw/autolocation/, Sep. 19, 2019, pp. all.
"Hybrid Cloud Storage with Cloudian HyperStore and Amazon S3", Cloudian Inc.; www.cloudian.com, 2014, pp. all.
"Improving client response time by providing SMB automatic node referrals with Auto Location", NetApp https://library.netapp.com/ecmdocs/ECMP1196891/html/GUID-0A5772A4-A6D7-4A00-AC2A-92B868C5B3B5.html, Sep. 19, 2019, pp. all.
"Introducing HPE Cloud Volumes Backup Chalk Talk", HPE Technology, 2020, pp. 1-5.
"Introduction to Oracle Data Guard", Oracle https://docs.oracle.com/en/database/oracle/oracle-database/19/sbydb/introduction-to-oracle-data-guard-concepts.html#GUID-5E73667D-4A56-445E-911 F-1 E99092DD8D7, Dec. 20, 2021, pp. 1-20.
"Managing replication storage rules", IBM Storage Protect Operations Center | https://www.ibm.com/docs/en/spoc/8.1.19?topic=rules-replication-storage, Aug. 11, 2023, pp. 2.
"Managing Workloads", NetApp https://docs.netapp.com/ontap-9/index.jsp?topic=%2Fcom.netapp.doc.pow-perf-mon%2FGUID-13D35FC5-AF37-4BBD-8A8E-B10B41451A16.html, Sep. 19, 2019, pp. all.
"Neverfail User Guide", Neverfail HybriStor v2.3 | https://neverfail.com/, 2017, pp. 1-58.
"Nutanix AFS—Introduction & Steps For Setting Up", Retrieved from https://virtual building blocks. com/2 0 1 8/01 /03/nutanix-afs-introduction-steps-for-setting-up/ (Year: 2018), Jan. 3, 2018, 1-23.
"Nutanix Files Guide", Nutanix Files 3.7, Nov. 23, 2021, pp. 1-174.
"Nutanix Files Guide", Nutanix, Sep. 14, 2018, pp. all.
"Nutanix-Files", Nutanix, Inc. v7.0 https://download.nutanix.com/solutionsDocs/TN-2041-Nutanix-Files.pdf, Oct. 2021, pp. 1-89.
"Oracle ZFS Storage Appliance: How To Optimize Replication Performance", Oracle System Handbook—ISO 7.0, Aug. 1, 2018, pp. 1-3.
"Path Failover and Virtual Machines", vSphere Storage; Update 2; VMware vSphere 7.0; VMware ESXi 7.0; vCenter Server 7.0; https://docs.vmware.com/en/VMware-vSphere/7.0/vsphere-esxi-vcenter-server-702-storage-guide.pdf, Jun. 25, 2021, pp. 238.
"Preparing Storage Systems for Snapmirror Replication", NetApp ; NetApp, Apr. 2005, pp. all.
"Protect Your Data With Netapp Element Software", Solution Brief; NetApp, 2018, pp. all.
"Quantum User Essentials", Quantum, 2013, pp. 1-2.
"Replication for File Systems", Commvault, Jan. 4, 2022, pp. 1.
"Replication: Remote Replication Introduction", Oracle Sun ZFS Storage 7000 System Administration Guide, Dec. 2012, pp. 1-6.
"Reversing the Direction of Replication", Oracle ZFS Storage Appliance Administration Guide, 2014, pp. 1-2.
"Self Service Backup and Restoration(TrilioVault) Service Scope", UKCloud https://docs.ukcloud.com/articles/openstack/ostack-sco-triliovault.html, Retrieved Jun. 1, 2022, pp. 1-3.
"Server-to-Server Storage Replication with Storage Replica", Microsoft https://docs.microsoft.com/en-us/windows-server/storage/storage-replica/server-to-server-storage-replication,, Jul. 29, 2021, pp. 1-20.
"Setting up and Using Acropolis File Services (AFS) on Nutanix AOS 5.0", Virtual Dennis—Sharing Technical Tips Learned the Hard Way, Dec. 30, 2016, pp. all.
"Storage Replica Overview", Microsoft thttps://docs.microsoft.com/en-us/windows-server/storage/storage-replica/storage-replica-overview, Jul. 29, 2021, pp. 1-11.
"Tech TopX: AHV One Click Upgrade", Screen captures from YouTube video clip, 13 pages, uploaded on Dec. 8, 2015 by user "Nutanix University". Retrieved from Internet: https://www.youtube.com/watch?v=3dALdzw6qZM, Dec. 8, 2015, pp. all.
"Technical Overview and Best Practices", VMware vSphere VMFS ; a VMware Technical White Paper updated for VMware vSphere 5.1, Version 3.0, Nov. 27, 2012, pp. all.
"Understanding Multipathing and Failover", vSphere Storage; VMware vSphere 7.0; VMware ESXi 7.0; vCenter Server 7.0 https://docs.vmware.com/en/VMware-vSphere/7.0/vsphere-esxi-vcenter-server-702-storage-guide.pdf, Jun. 25, 2021, pp. 234-268.
"Virtual Disk Manager User's Guide: Virtual Disk Development Kit", vmware.com; https://www.vmware.com/pdf/VirtualDiskManager.pdf, 2008, 1-12.
"VMware vCenter Server: Centrally Mananged Virtual Infrastructure Delivered with Confidence", VMWare Datasheet; https://www.vmware.com/content/dam/digitalmarketing/vmware/en/pdf/products/vCenter/vmware-vcenter-server-datasheet.pdf, captured Aug. 20, 2021, 2015, 2015, pp. 1-2.
"VMware VSAN 7.0 Release Notes", VMware; https://docs.vmware.com/en/VMware-vSphere/7.0/rn/vmware-vsan-70-release-notes.html, Mar. 8, 2021, pp. 1-12.
"VSAN 7.0 U2 Proof of Concept Guide", VMwareStorage; https://images.core.vmware.com/sites/default/files/resource/vsan_70_u2_proof_of_concept_guide_noindex.pdf, Apr. 2021, pp. 1-267.
"VSAN File Services Tech Note | VMware", Aug. 2021, 1-7.
"VSAN Health Service—File Service—File Server Health (77165)", VMware, Knowledge Base; https://kb.vmware.com/s/article/77165, May 15, 2021, pp. 1-5.
"VSAN Monitoring and Troubleshooting—VMware vSphere 7.0", https://docs.vmware.com/, Sep. 2018, 1-61.
"VSAN Performance Graphs in the vSphere Web Client (2144493)", Nov. 9, 2020, 1-42.
"VSan Planning and Deployment", Update 2 VMWare vSphere 6.7; VMware vSAN 6.7; https://docs.vmware.com/en/VMware-vSphere/6.7/vsan-673-planning-deployment-guide.pdf, Aug. 20, 2019, pp. 1-85.
"VSan Stretched Cluster Guide", VMwareStorage; https://images.core.vmware.com/sites/default/files/resource/vsan_stretched_cluster_guide_noindex.pdf, printed Jun. 24, 2021, Jun. 2020, pp. 1-62.
"VSphere Availability—VMware vSphere 6.7", https://docs.vmware.com/, Jan. 11, 2019, 1-105.
"VSphere Storage—VMware vSphere 6.7", https://docs.vmware.com/, Jan. 4, 2021, 1-382.
Bessette, Karinne , "Self-service and Backup Copy in New Veeam Backup for Microsoft 365 v6", Veeam https://www.veeam.com/blog/self-service-backup-copy-microsoft-365.html, Mar. 9, 2022, pp. 1-6.
Bhardwaj, Rishi , "The Wonderful World of Distributed Systems and the Art of Metadata Management", Nutanix, Inc., https://www.

(56) References Cited

OTHER PUBLICATIONS nutanix.com/blog/the-wonderful-world-of-distributed-systems-and-metadata-management; captured Aug. 19, 2021, Sep. 24, 2015, pp. 1-8.

Birk, Ryan , "How it Works: Understanding vSAN Architecture Components", altaro.com, Feb. 28, 2018, 1-10.

Bounds, Jay , "High-Availability (HA) Pair Controller Configuration Overview and Best Practices", NetApp, Feb. 2016, pp. all.

Cano, Ignacio et al., "Curator: Self-Managing Storage for Enterprise Clusters", University of Washington, Mar. 2017, pp. all.

Cormac, , "Native File Services for vSAN 7", CormacHogan.com; https://cormachogan.com/2020/03/11/native-file-services-for-vsan-7/, Mar. 11, 2020, 1-23.

Costa, Jorge , "High Availability Setup Using Veritas Cluster Server and NetApp Synchronous SnapMirror—One button Failover/Failback with SnapMirror Sync and Veritas Cluster Server", NetApp Community, Nov. 18, 2010, pp. all.

Feroce, Danilo , "Leveraging VMware vSAN for Highly Available Management Clusters", VMware, Inc., Version 2.9, VMware, Inc.; https://www.vmware.com/content/dam/digitalmarketing/vmware/en/pdf/vcat/vmware-leveraging-virtual-san-for-ha-management-clusters.pdf, Jan. 2018, 1-22.

Fojta, Tomas , "Quotas and Quota Policies in VMware Cloud Director", Tom Fojta's Blog; retrieved from: https://fojta.wordpress.com/2020/11/06/quotas-and-quota-policies-in-vmware-cloud-director/, Nov. 6, 2020, 1-4.

Fojta, Tomas , "vSAN File Services with vCloud Director—Tom Fojta's Blog", (wordpress.com) ("Fojta Blog"), Feb. 11, 2021, pp. 1-8.

Hogan, Cormac , "New updates from Nutanix—NOS 3.0 and NX-3000", https://cormachogan.com/2012/12/20/new-from-nutanix-nos-3-0-nx-3000/, Dec. 20, 2012, pp. 1-7.

Jeffrey, Hemmes et al., "Cacheable Decentralized Groups for Grid Resource Access Control", 2006 7th IEEE/ACM International Conference on Grid Computing Department of Computer Science and Engineering, University of Notre Dame, doi: 10.1109/ICGRID.2006.311015, Sep. 2006, pp. 192-199.

Jung, Young-Woo et al., "Standard-Based Vitrual Infrastructure Resource Management for Distributed and Heterogeneous Servers", ICACT, Feb. 15, 2009, pp. all.

Kaam, Bas V. , "New in AOS 5.0: Nutanix Acropolis File Services", basvankaam.com, Jan. 5, 2017, pp. all.

Kemp, Erik , "NetApp SolidFire SnapMirror Architecture and Configuration", Technical Report, NetApp, Dec. 2017, pp. all.

Kleyman, Bill , "How Cloud Computing Changes Storage Tiering", https://www.datacenterknowledge.com ; captured Jun. 4, 2019, Nov. 12, 2015, pp. all.

Leibovici, Andre , "Nutanix One-Click Upgrade now takes care of Firmware and Hypervisor too!", myvirtualcloud.net https://myvirtualcloud.net/nutanix-one-click-upgrade-now-takes-care-of-firmware-and-hypervisor-too/, Jul. 31, 2014, pp. 1-4.

Nemnom, Charbel , "How To Enable Self-Service Restore in Azure File Sync", https://charbelnemnom.com/how-to-enable-self-service-restore-in-azure-file-sync/, Jan. 22, 2022, pp. 1-7.

Rajendran, Cedric , "Working with vSAN Health Checks", VMware vSan Virtual Blocks Blog; https://blogs.vmware.com/virtualblocks/2019/07/18/working-with-vsan-health-checks/, Jul. 18, 2019, pp. 1-6.

Ruth, Paul , "Autonomic Live Adaption of Virtual Computational Environments in a Multi-Domain Infrastructure", 2006 IEEE International Conference on Autonomic Computing, 2006, pp. 5-14.

Seget, Vladan , "VMware vSAN 7 now with native file services and quotas", 4sysops; https://4sysops.com/archives/vmware-vsan-7-now-with-native-file-services-and-quotas/, May 1, 2020.

Seget, Vladan , "VMware vSphere 7.0 and vSAN storage improvements", retrieved from: https://4sysops.com/archives/vmware-vsphere-7-0-and-vsan-storage-improvements/, Apr. 1, 2020, pp. 1-12.

Sturniolo, Andy , "VMware vSAN File Services and Veeam", Veeam Blog, https://www.veeam.com/blog/veeam-backup-vsan-file-services.html, Jul. 22, 2020, 1-9.

"14.2. ID Range Assignments During Installation", https://access.redhat.com/documentation/en-us/red_hat_enterprise_linux/7/html/linux_domain_identity_authentication_and_policy_guide/id-ranges-at-install, 2023, pp. 1-3.

"14.5. Manual ID Range Extension and Assigning a New ID Range", https://access.redhat.com/documentation/en-us/red_hat_enterprise_linux/7/html/linux_domain_identity_authentication_and_policy_guide/man-set-extend-id-ranges, 2023, pp. 1-4.

"Chapter 14. Unique UID and GID Number Assignments", https://access.redhat.com/documentation/en-us/red_hat_enterprise_linux/7/html/linux_domain_identity_authentication_and_policy_guide/managing-unique_uid_and_gid_attributes#doc-wrapper, 2023, pp. 1-2.

"Chapter 2 Identity Mapping Administration (Tasks)", https://docs.oracle.com/cd/E19120-01/open.solaris/820-2429/6nelidaca/index.html, Retrieved Aug. 9, 2023, pp. 1-20.

"Dell EMC Unity", https://www.dell.com/support/kbdoc/en-in/000022644/usermapping-SID-uid-and-replicating-mapping-info-to-the-target-during-nas-server-replication, Retrieved Aug. 9, 2023, pp. 1.

"IBM Storwize V7000 Unified", https://www.ibm.com/docs/en/flashsystem-v7000u/1.6.2?topic=maim-best-practices-authentication-id-mapping-configurations-while-using-asynchronous-replication-remote-caching, Mar. 31, 2021, pp. 1-3.

"ID mapping basic concepts", https://www.IBM.com/docs/en/flashsystem-v7000u/1.6.2?topic=mapping-id-basic-concepts, Feb. 27, 2021, pp. 1-8.

"Understanding name-mapping in a multiprotocol environment", https://kb.netapp.com/onprem/ontap/da/NAS/Understanding_name-mapping_in_a_multiprotocol_environment, Jun. 23, 2023, pp. 1-22.

Poitras, Steven , "The Nutanix Bible", https://nutanixbible.com/, Apr. 9, 2019, pp. all.

Poitras, Stevens , "The Nutanix Bible", https://nutanixbible.com/, Dec. 23, 2023, pp. 282.

Poitras, Steven , "The Nutanix Bible", http://stevenpoitras.com/the-nutanix-bible/ (Publication date based on indicated capture date by Archive.org; first publication date unknown), Jan. 11, 2014, pp. all.

Poitras, Steven , "The Nutanix Bible", https://nutanixbible.com/, Jan. 12, 2016, pp. all.

Poitras, Steven , "The Nutanix Bible", https://nutanixbible.com/, Jan. 3, 2017, pp. all.

Poitras, Steven , "The Nutanix Bible", https://nutanixbible.com/, Jan. 3, 2018, pp. all.

Poitras, Steven , "The Nutanix Bible", http://stevenpoitras.com/the-nutanix-bible/ (Publication date based on indicated capture date by Archive.org; first publication date unknown), Jan. 7, 2015, pp. all.

Poitras, Steven , "The Nutanix Bible", https://nutanixbible.com/, Jan. 8, 2019, pp. all.

Poitras, Steven , "The Nutanix Bible", https://nutanixbible.com/, Jul. 25, 2019, pp. all.

Poitras, Steven , "The Nutanix Bible", http://stevenpoitras.com/the-nutanix-bible/ (Publication date based on indicated capture date by Archive.org; first publication date unknown), Jun. 20, 2014, pp. all.

Poitras, Steven , "The Nutanix Bible", https://www.nutanixbible.com, Jun. 23, 2023, pp. 1-263.

Poitras, Steven , "The Nutanix Bible", https://nutanixbible.com/, Jun. 25, 2018, pp. all.

Poitras, Steven , "The Nutanix Bible", https://nutanixbible.com/, Jun. 8, 2017, pp. all.

Poitras, Steven , "The Nutanix Bible", http://stevenpoitras.com/the-nutanix-bible/ (Publication date based on indicated capture date by Archive.org; first publication date unknown), Jun. 9, 2015, pp. all.

Poitras, Steven , "The Nutanix Bible", https://nutanixbible.com/, Jun. 9, 2016, pp. all.

Poitras, Steven , "The Nutanix Bible", https://nutanixbible.com/, Mar. 2, 2020, pp. all.

Poitras, Steven , "The Nutanix Bible", https://nutanixbible.com/, Mar. 2, 2021, pp. all.

Poitras, Steven , "The Nutanix Bible", http://stevenpoitras.com/the-nutanix-bible/ (Publication date based on indicated capture date by Archive.org; first publication date unknown), Oct. 15, 2013, pp. all.

Poitras, Steven , "The Nutanix Bible", https://nutanixbible.com/, Sep. 1, 2020, pp. all.

(56) References Cited

OTHER PUBLICATIONS

Poitras, Steven , "The Nutanix Bible", https://nutanixbible.com/, Sep. 17, 2019, pp. all.
Poitras, Steven , "The Nutanix Bible", https://nutanixbible.com/, Sep. 3, 2021, pp. all.
Poitras, Steven , "The Nutanix Bible", https://nutanixbible.com/, Sep. 4, 2015, pp. all.
Poitras, Steven , "The Nutanix Bible—Classic Edition", https://nutanixbible.com/ (Mar. 1, 2023), Mar. 1, 2023, pp. all.
Poitras, Steven , "The Nutanix Bible—Classic Edition", https://nutanixbible.com/ (Sep. 9, 2022), Sep. 9, 2022, pp. all.

* cited by examiner

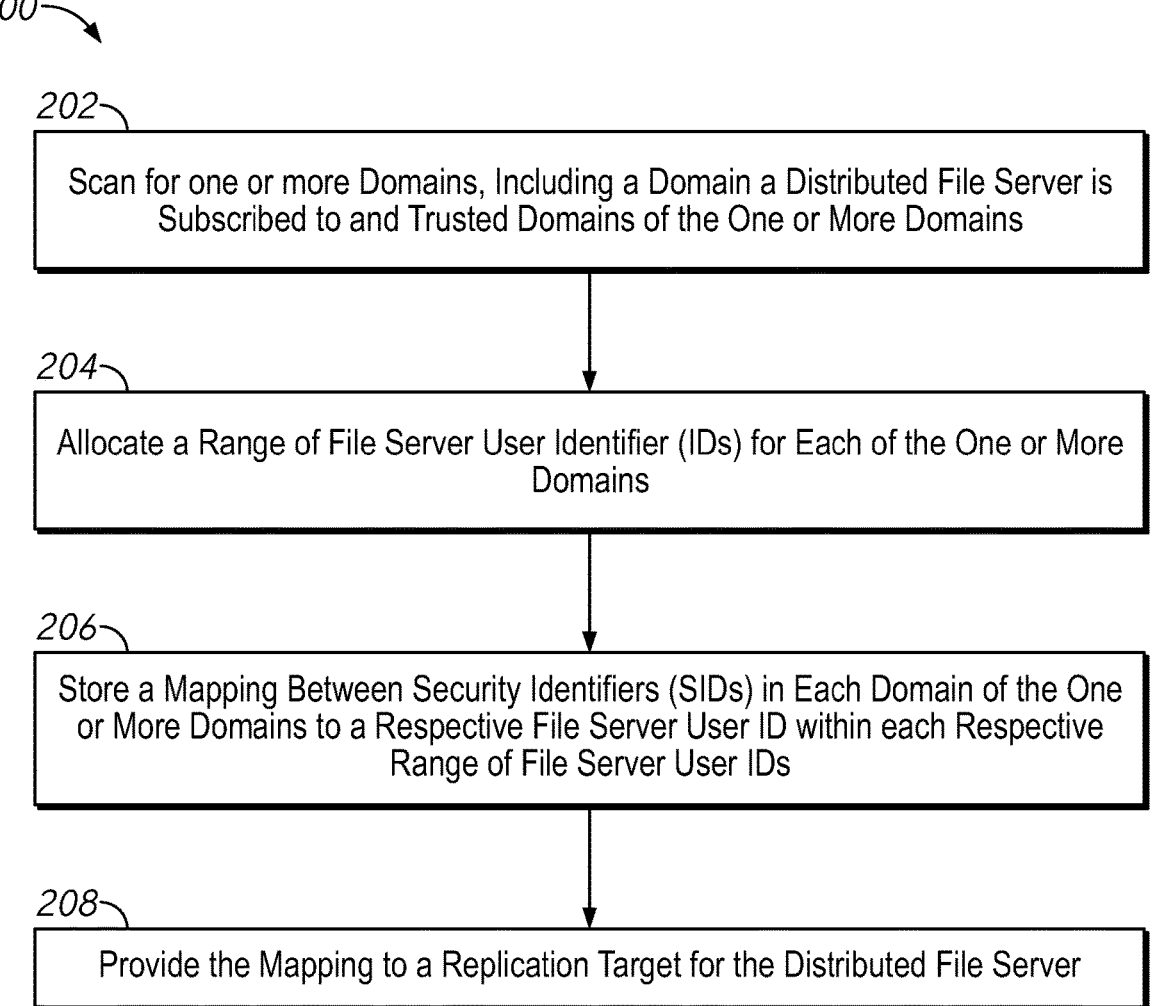

200

202

Scan for one or more Domains, Including a Domain a Distributed File Server is Subscribed to and Trusted Domains of the One or More Domains

204

Allocate a Range of File Server User Identifier (IDs) for Each of the One or More Domains

206

Store a Mapping Between Security Identifiers (SIDs) in Each Domain of the One or More Domains to a Respective File Server User ID within each Respective Range of File Server User IDs

208

Provide the Mapping to a Replication Target for the Distributed File Server

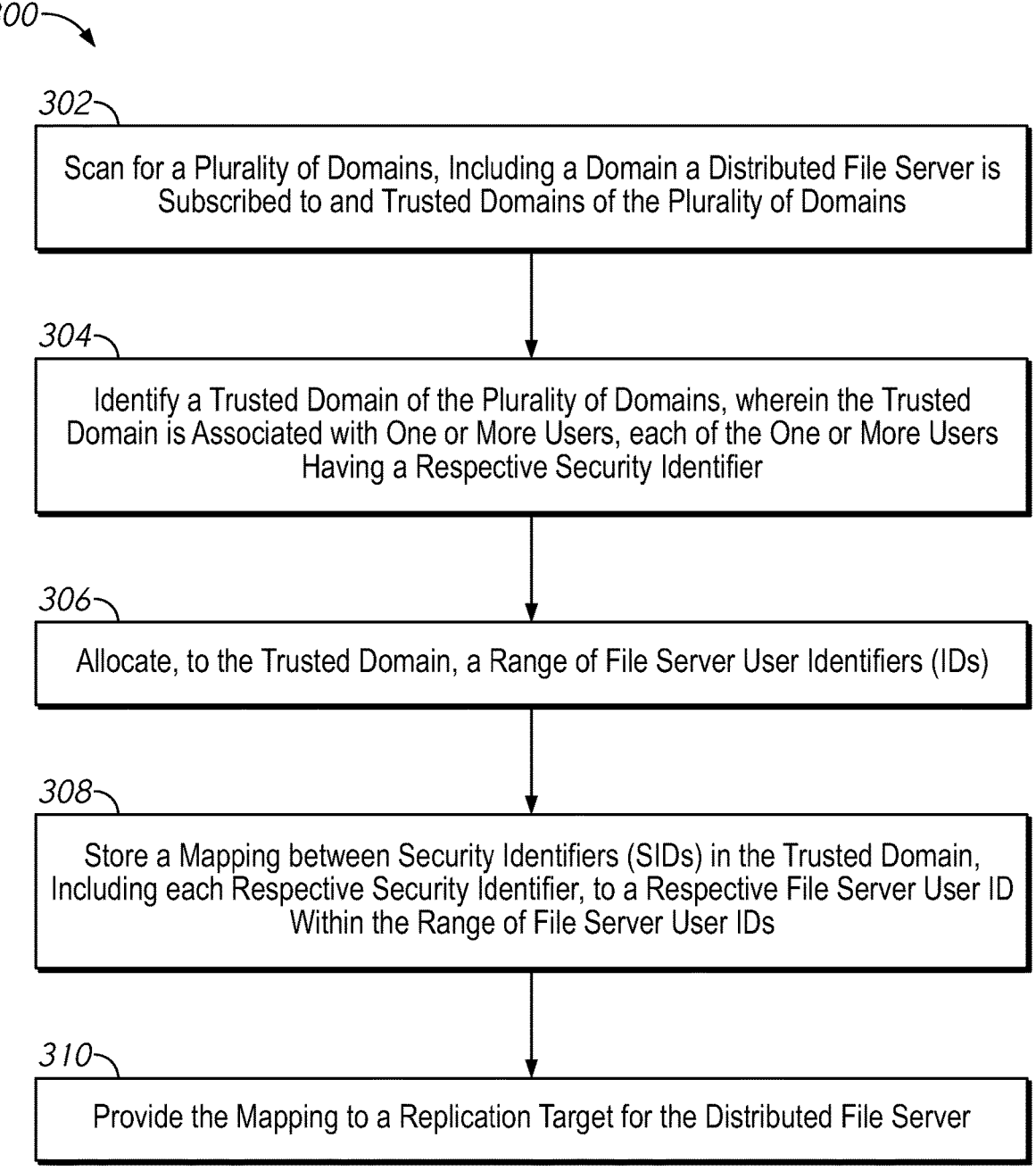

302

Scan for a Plurality of Domains, Including a Domain a Distributed File Server is Subscribed to and Trusted Domains of the Plurality of Domains

304

Identify a Trusted Domain of the Plurality of Domains, wherein the Trusted Domain is Associated with One or More Users, each of the One or More Users Having a Respective Security Identifier

306

Allocate, to the Trusted Domain, a Range of File Server User Identifiers (IDs)

308

Store a Mapping between Security Identifiers (SIDs) in the Trusted Domain, Including each Respective Security Identifier, to a Respective File Server User ID Within the Range of File Server User IDs

310

Provide the Mapping to a Replication Target for the Distributed File Server

FIG. 3

SYSTEMS AND METHODS FOR GENERATING CONSISTENT GLOBAL IDENTIFIERS WITHIN A DISTRIBUTED FILE SERVER ENVIRONMENT INCLUDING EXAMPLES OF GLOBAL IDENTIFIERS ACROSS DOMAINS

CROSS-REFERENCE TO RELATED APPLICATION(S)

This application claims priority to India application No. 202311064851 filed Sep. 27, 2023, which is incorporated herein by reference, in its entirety, for any purpose.

TECHNICAL FIELD

The present disclosure relates generally to systems and methods for generating consistent file server user identifiers (IDs), also described as global identifiers (GIDs), including use of a distributed file server. Examples of using the distributed file server to identify a trusted domain including a domain the distributed file server is subscribed to, allocate to the trusted domain a range of file server user IDs, and store a mapping between security identifiers (SIDs) in the trusted domain to respective file server user IDs within the allocated range are described. Examples of providing the mapping to a replication target during replication, migration, and/or disaster recovery is also described.

BACKGROUND

In a networked environment, a domain generally refers to a logical grouping of computing devices, users, and/or resources that are often managed by a centralized directory service like Active Directory. A file server may be a computer or device that is subscribed to the domain that stores and/or manages resources, such as files, folders, storage items, and other data that may be accessible to certain users within that domain. Users may be individuals or entities with accounts in the domain who can access resources on the file server. This relationship is such that users, through their domain accounts, may be granted permissions and access rights by administrators to connect to and interact with the file server. This grant of rights and permissions may allow users to store, retrieve, and/or manipulate the resources stored on the file server within the context of the domain's security and access permissions policies.

Traditionally, in various domain and file server systems, a user is assigned a local user identifier. This local user identifier is used for user authentication and resource access. When a new user joins the domain, or when a new user account is created, the new user receives a local user identifier. This local user identifier is one of the primary means of identifying and authenticating users within a domain setting services by a single file server. In traditional systems, local user identifiers are only unique to the file server and domain they are associated with, but may be the same or similar to a local user identifier assigned to local users of other file servers and/or other domains.

Because a local user of one file server and domain may have the same local user ID of another local user of a second file server and domain, when replication, migration, and or failover occurs, e.g., during disaster recovery of server replication, ID collision (e.g., two users of the same domain and/or file server) may result. In these cases, it may be impossible to correctly determine which local user has access and/or permissions to various resources.

BRIEF DESCRIPTION OF THE DRAWINGS

Reference is now made to the following descriptions taken in conjunction with the accompanying drawings, in which:

FIG. 2 is a flowchart of method 200 for generating consistent file server user identifiers (IDs) within a distributed file server environment and across domains, arranged in accordance with examples described herein;

FIG. 3 is a flowchart of method 300 for generating consistent file server user identifiers (IDs) within a distributed file server environment and across domains, arranged in accordance with examples described herein;

DETAILED DESCRIPTION

Figure 1:
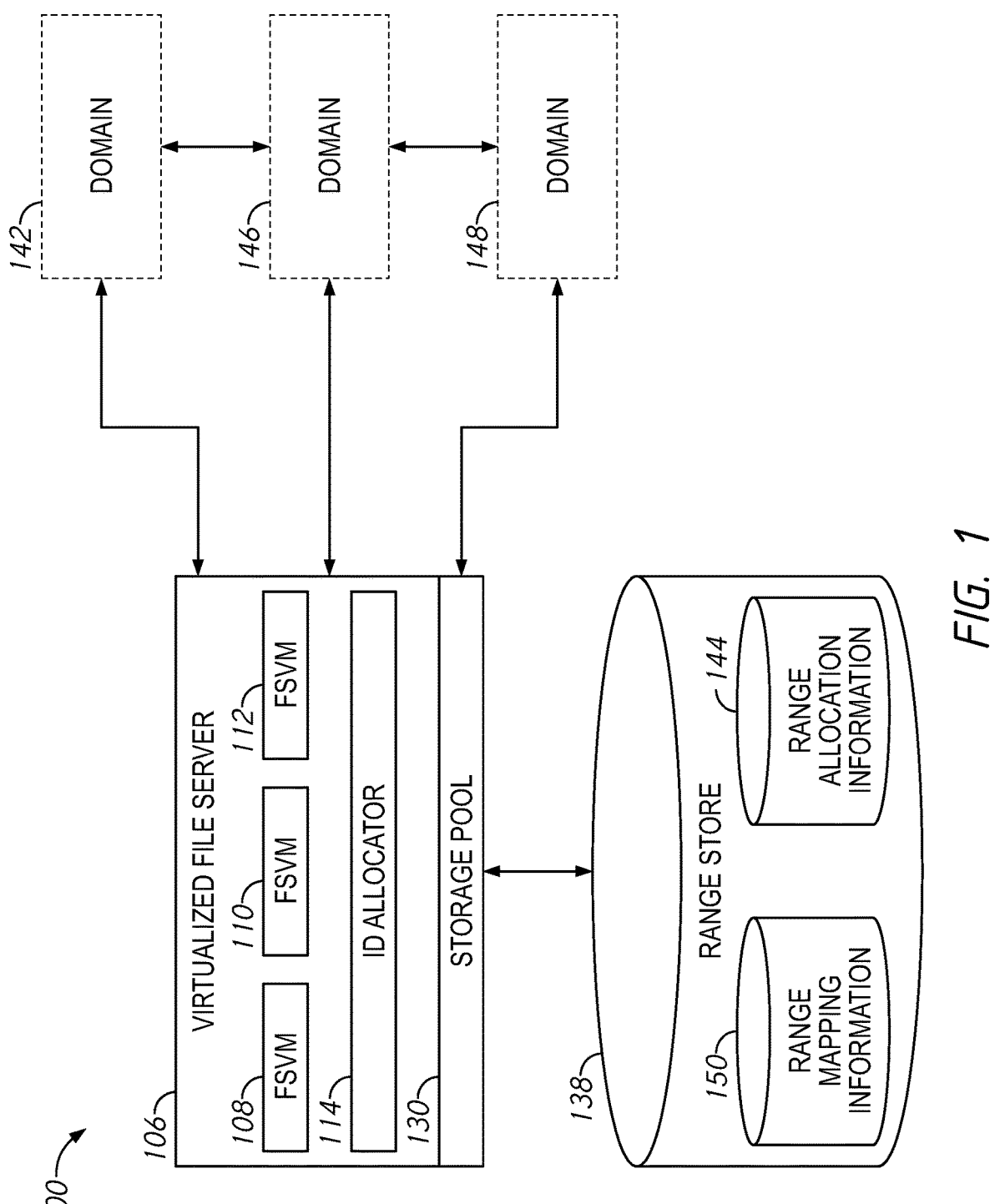
FIG. 1 is a schematic illustration of a system 100 for generating consistent file server user identifiers (IDs) within a distributed file server environment and across domains, arranged in accordance with examples described herein.

Certain details are set forth herein to provide an understanding of described embodiments of technology. However, other examples may be practiced without various of these particular details. In some instances, well-known computing system components, virtualization operations, and/or software operations have not been shown in detail in order to avoid unnecessarily obscuring the described embodiments. Other embodiments may be utilized, and other changes may be made, without departing from the spirit or scope of the subject matter presented herein.

With the implementation of domains subscribed to by multiple file servers (including distributed file servers), and the ability of a local user to access more than one domain and/or more than one file server, the flexibility and scalability that allocation and assignment of consistent unique user IDs across domains and file servers in a distributed system would offer would be advantageous.

Due in part to drawbacks of traditional systems described herein, it may be desirable to facilitate the generation, allocation, and assignment of consistent file server user identifiers (IDs), also described as global identifiers (GIDs), in a distributed file server system and across one or more domains. In this way, a virtualized file server scans for a plurality of domains, including a domain the virtualized (e.g., distributed) file server is subscribed to and trusted domains of the plurality of domains. A trusted domain of the plurality of domains is identified, where the trusted domain is associated with one or more users. Each user of the one or more users may be associated with and/or comprise a respective security identifier (SID). A range of file server user identifiers (IDs) is allocated to the trusted domain. Once the range of file server user identifiers (IDs) is allocated to the trusted domain, a mapping between security identifiers (SIDs) in the trusted domain, including each respective security identifier, to a respective file server user ID within the range of file server user IDs may be stored. In some examples, the mapping may be provided to a replication target for the distributed file server.

Examples described herein are generally directed towards a virtualized file server generating, allocating, and assigning consistent file server user identifiers (IDs) to local users and to be used by domains and/or file servers within a distributed file server environment and across domains. In operation, a virtualized file server of a distributed file server system may identify a trusted domain serviced by one or more file servers. The virtualized file server may allocate to the trusted domain a range of file server user IDs. The virtualized file server may store a mapping between local user security identifiers (SIDs) in the trusted domain and respective file server user IDs within the allocated range. The virtualized file server may provide the mapping to a replication target, such as during a replication and/or a disaster recovery event.

Generally, and as used herein, a cluster refers to a plurality of computing nodes that may work together to provide high availability, reliability, and/or scalability. A cluster of computing nodes may provide a distributed system where instances of a distributed service may be hosted on each of the plurality of computing nodes. If one computing node and/or instance of the distributed service becomes unavailable, another instance of the distributed application resident on another computing node may take over for operations of the instance that is unavailable. In some examples, one computing node and/or instance is a leader node which may coordinate operation of other computing nodes and/or instances in the cluster. In some examples, a single-node cluster is described. Examples of single-node clusters may include multiple instances of an application on a single computing node. Examples of single-node clusters may in some examples contain only single instances of applications. Single-node clusters may in some examples have less resiliency than multiple-node clusters.

Generally, and as used herein, a file server (such as a virtualized file server) may assign a local user a local user system identification (e.g., a local user SID, or an SID). The local user SID may be based on an identification of the virtualized file server and/or domain which is registering the local user and/or which the local user is associated with. For example, the local user SID may include a prefix, suffix, or other portion, which identifies the virtualized file server and/or the domain, or is an indicia representative of a virtualized file server. In one non-limiting example, a local user SID may be given as SID-1-2-xxx-yyy, where "yyy" is a portion unique for each user, "xxx" is a portion that uniquely identifies the domain, and "1-2" is specific to the domain. In some examples, the "yyy" portion may be referred herein to as a relative user identifier (RID).

Accordingly, the present disclosure generally relates to systems and methods for generating consistent file server user identifiers (IDs), also described as global identifiers (GIDs), including use of a virtualized file server. Advantageously, systems and methods described herein both assist with preventing and/or minimizing ID collision that occurs upon failover and/or server migration/replication, and assists file servers making certain decisions, such as those relating to quotas. Advantageously, systems and methods described herein provide for user identifiers that are globally unique, and globally unique (and consistent) identifiers across distributed file servers provide accurate statistics that rely on these IDs (e.g., local user SIDs, GIDs, etc.), such as calculating local user quotas for a given share and/or access checks that rely on a number of platform, domain, file server, and/or share permissions.

Turning now to FIG. 1, FIG. 1 is a schematic illustration of a system 100 for generating consistent file server user identifiers (IDs) within a distributed file server environment and across domains, arranged in accordance with examples described herein. As described herein, system 100 of FIG. 1 includes virtualized file server 106, which may provide a user interface (not shown). In some examples, virtualized file server 106 may be in communication with the additional and/or alternative virtualized file servers, over one or more networks, not shown. Virtualized file server 106 may be in communication with memory and/or storage for range store 138, which may include range allocation information 144, and/or range mapping information 150. Virtualized file server 106 may be hosted in a virtualization environment. Virtualized file server 106 may include a cluster of computing nodes hosting a cluster of file server virtual machines (FSVM). For example, virtualized file server 106 includes FSVM 108, FSVM 110, and FSVM 112. Virtualized file server 106 may include ID allocator 114, configured to, in some examples, perform operations for generating consistent file server user identifiers (IDs) within a distributed file server environment and across domains, such as domain 142, domain 146, and/or domain 148. Virtualized file server 106 may include virtualized storage and/or a storage pool. For example, virtualized file server 106 may include storage pool 130. Virtualized file server 106 may include storage and/or memory for storing data and/or metadata.

Virtualized file server 106 may be in communication with a database for storing data and/or metadata, such as range store 138. Range store 138 may include, among additional and/or alternative data and metadata, range allocation information 144, and/or range mapping information 150. The range store 138 may be implemented using storage in the storage pool 130 in some examples.

Virtualized file server 106 may be in communication with and/or subscribed to one or more domains in System 100, including in some examples, one or more of domain 142, domain 146, and/or domain 148. As used herein, a virtualized file server may be subscribed to a domain if it is configured to be a "member" of that domain. One or more of domain 142, domain 146, and/or domain 148 may be a trusted domain. One or more of domain 142, domain 146, and/or domain 148 may be an active directory domain. One or more of domain 142, domain 146, and/or domain 148 may have one or more subscribed virtualized file servers, such as virtualized file server 106.

The components shown in FIG. 1 are exemplary only. Additional, fewer, and/or different components may be used in other examples. For example, while one virtualized file server is depicted in FIG. 1, any number may be used. While three domains are depicted in FIG. 1, additionally and/or different and/or fewer domains may be used. While a single virtualized file server is depicted as being subscribed to one or more of the domains in FIG. 1, additional and/or alternative and/or fewer virtualized file servers may be used. In some examples, while virtualized file server 106 is described herein, additional and/or alternative virtualized (e.g., distributed) file servers may also be used to implement and/or use the systems and methods described herein.

Moreover, and as used herein, a cluster refers to a plurality of computing nodes that may work together to provide high availability, reliability, and/or scalability. A cluster of computing nodes may provide a distributed system where instances of a distributed service may be hosted on each of the plurality of computing nodes. If one computing node and/or instance of the distributed service becomes unavailable, another instance of the distributed application resident on another computing node may take over for operations of the instance that is unavailable. In some examples, one computing node and/or instance is a leader node which may coordinate operation of other computing nodes and/or instances in the cluster. In some examples, a single-node cluster is described. Examples of single-node clusters may include multiple instances of an application on a single computing node. Examples of single-node clusters may in some examples contain only single instances of applications. Single-node clusters may in some examples have less resiliency than multiple-node clusters.

Examples of systems described herein may accordingly include one or more virtualized file servers, such as virtualized file server 106 in FIG. 1. A virtualized file server may represent a logical entity in the system. Virtualized file servers described herein may be hosted in generally any virtualization environment (e.g., on generally any virtualization platform). The virtualization environment and/or platform generally refers to the storage resources that have been virtualized by the virtualized file server and the compute resources (e.g., computing nodes with processor(s)) used to manage the virtualized storage. For example, the virtualized file server 106 may be hosted on a different virtualization environment than additional and/or alternative virtualized file servers described herein (not shown). Nonetheless, in some examples one or more virtualized file servers described herein may be hosted in a same virtualization environment. As used herein, an Active Directory domain is one example of a domain. In examples, users and/or customers may have to set up a Windows Active Directory domain, and then configure a file server (e.g., a virtualized file server) as a member server to it (e.g., subscribed to it).

Examples of virtualization environments include, for example, on-premises installations of one or more computing nodes and storage devices. Examples of virtualization environments include one or more cloud computing systems (e.g., Amazon Web Services, Microsoft Azure). Although not shown explicitly in FIG. 1, virtualization environments and/or virtualized file servers may include additional components including, but not limited to, one or more hypervisors, storage controllers, operating systems, and/or container orchestrators (e.g., Kubernetes). Virtualized file server 106 and the alternative and/or additional virtualized file servers described herein (not shown) may, in some examples, be located in different geographic locations (e.g., different buildings, states, cities, or countries).

Examples of systems described herein may accordingly include one or more domains, such as domain 142, domain 146, and domain 148. In some examples, and as illustrated in FIG. 1, virtualized file server 106 may be subscribed to one or more of domain 142, domain 146, and domain 148. In some examples, one or more of domain 142, domain 146, and domain 148 may be an Active Directory domain. In some examples, one or more of domain 142, domain 146, and domain 148 may be a trusted domain configured to communicate with one or more virtualized file servers. As used herein, a domain is a logical and hierarchical organization of networked computers, users, and resources within a network environment. In some examples, a domain may be a user directory domain, such as an active directory domain. In some examples, a domain may serve as a centralized system for managing and controlling access to these and/or other resources. In some examples, domains enable administrators or others to define security policies, user access rights, and authentication mechanisms, ensuring a sure and efficient network operation. While domain 142, domain 146, and domain 148 are explicitly shown in FIG. 1, it should be appreciated that virtualized file server 106 may be associated with one or more additional and/or alternative domains. In some examples, one or more file server virtual machines (FSVMs), such as FSVM 108, FSVM 110, and FSVM 112 may be a domain. In some examples, a file server may be subscribed to a domain. For example, the virtualized file server 106 of FIG. 1 may be subscribed to the domain 146, which may be an active directory domain. One domain may have a trusted relationship with other domains. For example, the domain 146 may be in a trusted relationship with domain 142 and domain 148. The domain 142 and 148 may be other user directory domains, such as other active directory domains. In this manner, users from the domain 142 and/or domain 148 may utilize (e.g., send requests to and/or receive data from) the virtualized file server 106 by virtue of their trusted relationship with the domain 146, where the virtualized file server 106 is subscribed to the domain 146.

Examples of virtualized file servers described herein, such as virtualized file server 106 may include a cluster of virtual machines and/or other virtualized entities (e.g., containers), which may be referred to as file server virtual machines (FSVMs). In some examples, each of the file server virtual machines of a cluster may be implemented on different computing nodes forming a computing node cluster. For example, the FSVM 108, FSVM 110, and FSVM 112 of virtualized file server 106 may each be implemented on separate computing nodes of a computing node cluster used by the virtualized file server 106. Similarly other FSVMs of other virtualized file servers (not shown) may each be implemented on separate computing nodes of a computing node cluster used by the other virtualized file servers (not shown). In some examples, a cluster of FSVMs may be implemented on a cloud computing system.

The FSVMs may operate to provide a file system on the storage resources of the virtualized file server. The file system may have a single namespace and may store data in accordance with filenames and/or directories. The FSVMs may accordingly support one or more file system protocols, such as network file system (NFS) and/or server message block (SMB). A virtualized file server (such as virtualized file server 106) may translate file system protocol requests for one or more files and/or directories (e.g., a file path) into one or more storage requests to access the data corresponding to the file, directory, and/or file path. Any of a variety of components of the virtualized file server may be used to perform the translation (e.g., one or more FSVMs, one or more hypervisors, and/or one or more storage controllers). The translation may be performed using a map (e.g., a shard map) relating the location of the data to the file name, directory, and/or file path.

Examples of virtualized file servers described herein may include virtualized storage and/or one or more storage pools. For example, the virtualized file server 106 may include storage pool 130. The storage pool may generally include any number or kind of storage devices—for example, network attached storage, local storage of one or more computing nodes forming the virtualized file server, and/or cloud storage. Storage devices may be implemented using, for example, one or more memories, hard disk drives, or solid state drives. The storage pool for a particular virtualized file server may be referred to as a storage pool. The storage pool may store one or more shares. Generally, the storage pool may refer to a storage pool which may include any of a variety of storage devices. In some examples, virtualized file server(s) described herein may be implemented in a hyper-converged architecture. For example, the storage pool may include local storage devices of the computing nodes used to host the virtualized file server. For example, storage pool 130 may include a storage pool. One or more shares of a file system provided by the virtualized file server 106 may be distributed across storage device of the storage pool, including local storage devices of one or more computing nodes on which the FSVM 108, FSVM 110, and/or FSVM 112 reside. In some examples, each file server virtual machine (FSVM) may manage (e.g., host) a corresponding share or a portion of the share. A map may store associations between shares and files, directories, and/or file paths.

Examples of virtualized file servers described herein, including virtualized file server 106, may include metadata. For example, virtualized file server 106 may include a database and/or other storage, such as range store 138. Range store 138 may be stored, for example, in a storage pool, such as storage pool 130 and/or other storage location accessible to the virtualized file servers described herein. The range store may in some examples be distributed across the storage pool of a virtualized file server. In some examples, the range store may a database accessible to and/or hosted by the virtualized file server (e.g., a distributed database). Data and/or metadata stored by range store 138 in a virtualized file server may include, for example, authentication information for the virtualized file server and/or virtual machines in the virtualized file server, authorization information for the virtualized file server and/or virtual machines in the virtualized file server, configuration information for the virtualized file server and/or virtual machines in the virtualized file server, end point information (e.g., supported application programming interface (API) calls and/or endpoints), a number of shares stored in the storage pool of the virtualized file server, a protocol supported by each share and/or FSVM (e.g., NFS and/or SMB), identities of the shares stored in the storage pool of the virtualized file server, a number of file server virtual machines (FSVMs) present in the virtualized file server, a number of files and/or directories hosted by the virtualized file server, compute resources available and/or used at the virtualized file server, storage resources available and/or used at the virtualized file server, or other data and/or metadata regarding the virtualized file server. The range store may be maintained by the virtualized file server—for example, the data and/or metadata stored in range store 138 may be updated as the number of shares, FSVMs, storage resources, and/or compute resources change.

Examples of range stores described herein, including range store 138, may include range allocation information 144, and/or range mapping information 150. In some examples, range allocation information 144 may include information regarding a number of file server user IDs (e.g., global IDs) that have been allocated to one or more domains of system 100, such as domain 146 and/or domain 148. Examples of range stores described herein, including range store 138, may include range mapping information 150. In some examples, range mapping information 150 may store information regarding the mapping of one or more GIDs within an allocated range of GIDs in a data structure, a log file, or any additional and/or alternative format. In some examples, range allocation information 144, and/or range mapping information 150 may include any additional and/or alternative data and/or metadata used to manage, communicate with, and/or otherwise interact with virtualized file servers described herein.

Examples of virtualized file servers, such as virtualized file servers 106 of FIG. 1 described herein, may be implemented using one or more computing devices. In some examples, an administrative computing system may be used. The administrative computing system may include, for example, one or more processors and non-transitory computer readable storage media encoded with instructions for performing the virtualized file servers operations described herein. In some examples, the virtualized file servers may be implemented using a computing device different than the computing devices (e.g., computing nodes) used to implement the additional and/or alternative virtualized file server(s) described herein (not shown). Virtualized file servers such as virtualized file servers 106, may be hosted on premises systems in some examples, and/or on cloud computing systems in other examples.

Examples of virtualized file servers described herein may provide one or more user interfaces (not shown). The user interface may allow a user (e.g., a human administrator and/or another computer process) to view information regarding the virtualized file server, to communicate with the virtualized file server, to manage the virtualized file server, and generally to offer a single pane of glass interface to the virtualized file server. The user interface may be implemented, for example, using one or more display(s) and one or more input and/or output device(s) (e.g., mouse, keyboard, touchscreen, etc.). In some examples, a user interface may be used to depict virtualized file server 106. For example, the identity and number of shares used by the virtualized file server may be displayed. In some examples, the number and identity of computing nodes and/or FSVMs in the virtualized file server may be displayed. Other attributes of the virtualized file server may additionally or instead be displayed using the user interface. The data used in the display may wholly and/or partially be obtained from the registration information and/or metadata synchronized with the virtualized file server.

Examples of virtualized file servers described herein may accordingly include an ID allocator, such as ID allocator 114. The ID allocator may be implemented using software (e.g., an ID allocation service). The ID allocator may accordingly be implemented using executable instructions stored one or more computer readable media, the executable instructions including instructions, which, when executed by one or more processors of a virtualized file server, cause the virtualized file server to perform the ID allocation operations described herein. The ID allocator 114 may be provided on one or more computing nodes of the virtualized file server 106. In some examples, the ID allocator 114 may be included in an FSVM, such as in FSVM 108, FSVM 110, and/or FSVM 112. In some examples, the ID allocation may be a distributed service and an instance of the ID allocation service may be provided on each computing node and/or each FSVM in a virtualized file server, and the instances may work collaboratively to implement the ID allocation operations. In some examples, a lead FSVM and/or a lead computing node may be used to implement the ID allocation operations.

Examples of virtualized file servers described herein may be in communication with and/or store range allocation information, such as range allocation information 144. Range allocation information 144 may include information regarding a number of file server user IDs (e.g., global IDs) that have been allocated to one or more domains of system 100, such as domain 142, domain 146, and/or domain 148. In some examples, a first range of GIDs may be allocated to domain 142, a second range of GIDs may be allocated to domain 146, and a third range of GIDs may be allocated to domain 148. In some examples, range allocation information may include information regarding which range of GIDs was allocated (e.g., by virtualized file server 106) to which domain in system 100. In some examples, range allocation information 144 may include additional and/or alternative ranges that may be allocated to domain 142, domain 146, and/or domain 148 as additionally-added ranges of GIDs. In some examples, range allocation information may include metadata associated with the first range of GIDs allocated to domain 142, the second range of GIDs allocated to domain 146, and the third range of GIDs allocated to domain 148.

In some examples, the range allocation information 144 may include any additional and/or alternative data and/or information relating to or associated with the allocation of GIDs to one or more domains, by a virtualized file server, within system 100. In some examples, range allocation information 144 may include information regarding the number of domains within system 100, as well as which of those domains (if any) are trusted domains. In some examples, range allocation information 144 may include information regarding the number of domains within system 100, as well as which of those domains (if any) are subscribed to one or more virtualized file servers, such as virtualized file server 106. In some examples, such trusted domain information may be stored in one or more additional and/or alternative locations (e.g., databases, distributed databases, local databases, datastores, range stores, etc.) in system 100, such as in range mapping information 150. In some examples, each GID within a range of GIDs allocated to a domain is unique, such that no GID is the same as another GID. In some examples, range allocation information 144 may include any additional and/or alternative data and/or metadata used to manage, communicate with, and/or otherwise interact with the virtualized file server. In some examples, range allocation information 144 may include any additional and/or alternative data and/or metadata used for generating, allocating, mapping, and/or providing consistent file server user identifiers (IDs) (e.g., GIDs) within a distributed file server environment.

Examples of virtualized file servers described herein, including virtualized file server 106, may store (and/or be in communication with a database that stores) range mapping information such as range mapping information 150. Recall that a user of a domain (e.g., an Active Directory domain) may be assigned an SID, including both a domain-specific portion and a relative user-specific portion (RID). Range mapping information 150 may include information regarding the mapping of one or more GIDs within an allocated range of GIDs, to one or more SIDs associated with users of said domain. In some examples, each SID associated with a user of a domain will be mapped to one GID within the range of allocated GIDs. In some examples, range mapping information 150 may store the information regarding the mapping of one or more GIDs within an allocated range of GIDs in a data structure, a log file, or any additional and/or alternative format. In some examples, range mapping information 150 may include any additional and/or alternative data and/or metadata used to manage, communicate with, and/or otherwise interact with the virtualized file server. In some examples, range mapping information 150 may include any additional and/or alternative data and/or metadata used for generating, allocating, mapping, and/or providing consistent file server user identifiers (IDs) (e.g., GIDs) within a distributed file server environment.

While the range store 138, range allocation information 144, and range mapping information 150 are depicted together in FIG. 1, they may be wholly and/or partially stored on one or more storage devices in some examples. The range store 138 may be, for example, a distributed database. The range allocation information 144 may be stored, for example, in a different database or other storage than the range mapping information 150. Any of a variety of database synchronization techniques may be used to synchronize the data and/or metadata of the range store 138 with virtualized file servers described herein, including virtualized file server 106.

During operation, and in some examples, a virtualized file server, such as virtualized file server 106 of FIG. 1, may (e.g., using ID allocator 114) scan for a plurality of domains, such as domain 142, domain 146, and domain 148 of system 100 of FIG. 1. In some examples, one or more distributed file server(s), such as virtualized file server 106, may be subscribed to one or more of the domains. In some examples, each domain of the plurality of domains may be different from each other. In some examples, each domain of the plurality of domains may be an Active Directory domain. In some examples, and as described herein, while domain 142, domain 146, and domain 148 are illustrated in FIG. 1, additional and/or alternative domains within system 100 are contemplated to be within the scope of this disclosure. In some examples, an FSVM, such as FSVM 108, FSVM 110, and/or FSVM 112 may be a domain. In some examples, a trusted domain identified by the virtualized file server may be an Active Directory domain. In some examples, the virtualized file server, such as virtualized file server 106 may be a distributed file server.

During operation, and in some examples, a virtualized file server, such as virtualized file server 106 of FIG. 1, may (e.g., using ID allocator 114) identify a trusted domain of the plurality of domains scanned. In some examples, the identified trusted domain may be associated with one or more local users. In some examples, each local user associated with the identified trusted domain may comprise (e.g., have an assigned) a local user SID. In some examples, and as described herein, each SID associated with a local user may comprise a domain-specific portion, a file server specific portion, and/or a relative user identifier (RID) portion.

During operation, and in some examples, a virtualized file server, such as virtualized file server 106 of FIG. 1, may (e.g., using ID allocator 114) allocate, to the identified trusted domain, a range of file server user identifiers (IDs) (e.g., GIDs). In some examples, every file server user ID in the range of file server user IDs is a GID. In some examples, and as described herein, virtualized file server 106 may allocate a first range of file server user IDs (e.g., GIDs) to a first domain (e.g., a trusted domain), such as domain 146 of FIG. 1. In some examples, and as described herein, virtualized file server 106 may allocate a second range of file server user IDs (e.g., GIDs) to a second domain, such as domain 148 of FIG. 1. In some examples, the GIDs in the first range allocated to the first domain are different from the GIDs in the second range allocated to the second domain. As one non-limiting example, a virtualized file server, such as virtualized file server 106 of FIG. 1, may allocate a first range of GIDs spanning 1 to 1,000,000 to a first domain, such as domain 146. Continuing with this example, virtualized file server 106 may allocate a second range of GIDs spanning 1,000,001-2,000,000 to domain 148.

In some examples, the ranges of GIDs allocated to the one or more domains (e.g., by vitalized file server 106) may be allocated on a per-share basis. In some examples, the ranges of GIDS allocated to the one or more domains may be allocated on a per-file share basis. In some examples, the ranges of GIDs allocated to the one or more domains may be allocated on a per-file server basis. In some examples, the ranges of GIDs allocated to the one or more domains may be allocated on a per-domain basis. In some examples, the data and/or metadata relating to the allocation of the range(s) of GIDs to the one or more domains may be stored in a range store (e.g., a distributed database, etc.), such as in range allocation information 144 of range store 138 of FIG. 1.

During operation, and in some examples, a virtualized file server, such as virtualized file server 106 of FIG. 1, may (e.g., using ID allocator 114) assign a file server user ID included in the range of file server user IDs to a user of the one or more users of the trusted domain. In some examples, and as described herein, each user of the one or more users of the trusted domain may be associated with an assigned SID. In some examples, the assigned SID comprises a trusted domain-specific portion and a relative user identifier (RID) specific portion. Continuing with the above example where a first domain is allocated a first range of GIDs spanning 1-1,000,000 and a second domain is allocated a second range of GIDs spanning 1,000,001-2,000,000, virtualized file server 106 may assign a first local user associated with a first domain and having an RID of 1,000, a GID of 1,000. Similarly, virtualized file server 106 may assign a second local user associated with a second domain and having an RID of 1,000, a GID of 1,001,000. As such, while each local user of the first domain and the second domain, respectively, has the same local user SID, each is assigned a unique global user identifier. The assigning of unique GIDs to local users of one or more domains in a system, such as system 100, minimizes, and in some examples, prevents instances of identifier (ID) collision.

In some examples, a virtualized file server may be subscribed to a primary domain, and the virtualized file server may allocate a range of GIDs to the primary domain into which is it configured (e.g., subscribed to, e.g., a member of), as well as to the domains trusted by the primary domain. As should be appreciated, multiple file servers (e.g., virtualized file servers) may be members of a (e.g., associated with) one or more domains. In some examples, each virtualized file server may have multiple FSVMs. In some examples, each VFS which contains multiple FSVMs may be configured as a member to a single domain, which in some examples may be referred to as a primary domain. In some examples, by virtue of it being member of this domain, users belonging to the other domains that have trust relation with this primary domain, may also access resources of the virtualized file server based on appropriate authentication and authorization.

During operation, and in some examples, a virtualized file server, such as virtualized file server 106 of FIG. 1, may (e.g., using ID allocator 114) store a mapping between local user security identifiers (SIDs) in the trusted domain, including each respective security identifier, to a respective file server user ID within the range of file server user IDs. In some examples, and as described herein, data and/or metadata associated with and/or corresponding to the mapping between local user security identifiers (SIDs) in the trusted domain and a respective file server user ID (e.g., GID) may be stored in one or more databases (e.g., a distributed database). In some examples, data and/or metadata associated with and/or corresponding to the mapping between local user security identifiers (SIDs) in the trusted domain and a respective file server user ID (e.g., GID) may be stored in range mapping information 150 of range store 138 of FIG. 1.

During operation, and in some examples, a virtualized file server, such as virtualized file server 106 of FIG. 1, may (e.g., using ID allocator 114) provide the mapping to a replication target for the distributed file server. In some examples, the replication target for the file server (e.g., distributed file server) is a destination target. In some examples, the replication target is a disaster recovery target. In some examples, the replication target is a combination of a destination target and a recovery target. In some examples, a virtualized file server, such as virtualized file server 106 of FIG. 1, may provide the mapping to the replication target for the distributed file server responsive to the occurrence a failover event. In some examples, a virtualized file server, such as virtualized file server 106 of FIG. 1, may provide the mapping to the replication target for the distributed file server responsive to the occurrence of a disaster recovery event. In some examples, a virtualized file server, such as virtualized file server 106 of FIG. 1, may provide the mapping to the replication target for the distributed file server responsive to the occurrence of a combination of a disaster recovery event and/or a failover event.

As should be appreciated, while a destination target and a disaster recovery target are discussed herein, additional and/or alternative replication targets are contemplated to be within the scope of this disclosure. As one example, additional and/or alternative replication targets that support and/or are associated with failover events and replication events are contemplated to be within the scope of this disclosure.

In some examples, should a disaster recovery and/or a failover event occur associated with virtualized file server 106 of FIG. 1, virtualized file server 106 may provide the mapping to replication target, such as another virtualized file server (not shown). In some examples, should a disaster recovery and/or a failover event occur associated with virtualized file server 106 of FIG. 1, virtualized file server 106 may provide the mapping to replication target, such as another virtualized file server (not shown). In some examples, should a disaster recovery and/or a failover event occur associated with virtualized file server 106 of FIG. 1, virtualized file server 106 may provide the mapping to one or more additional and/or alternative replication targets not shown in FIG. 1. In some examples, the replication target may be collocated with the instance of the failover/disaster recovery occurrence. In some examples, the replication target may not be collocated with the instance of the failover/disaster recovery occurrence.

Recall that in some examples, a virtualized file server may allocate a first range of file server user IDs to a first domain and a second range of file server user IDs to a second domain. With this in mind, during operation, and in some examples, a virtualized file server, such as virtualized file server 106 of FIG. 1, determine that a number of local user SIDs associated with an identified trusted domain exceeds a number of file server user IDs allocated to the trusted domain in the range of file server user IDs. In some examples, responsive to this determination, virtualized file server 106 may allocate another range of file server user IDs to the trusted domain. In some examples, virtualized file server 106 may allocate the another range, dynamically. In some examples, responsive to virtualized file server 106 allocating to the another range of file server user IDs to the trusted domain, virtualized file server 106 may store a mapping between the number of SIDs that exceed the number of file server user IDs allocated to the trusted domain, and the another range of file server user IDs.

In some examples, the user mappings may be stored in distributed database that may be accessed by all the FSVMs in a file server (e.g., virtualized file server 106). In some examples, this database may only be accessible only by the nodes in that file server. In some examples, for replication across multiple file servers like in a disaster recovery scenario (e.g., a Smart DR scenario), the distributed database specific to a share for a given file server may be copied over to the target file server.

Continuing with the above example, virtualized file server 106 may determine that the number of local users in the first domain exceeds the number of GIDs allocated to the first domain within the first range (e.g., the number of local users exceeds the 1,000,000 GIDs allocated to the first domain). In this example, virtualized file server 106 may dynamically allocate another range of GIDs to the domain to account for the additional local users in excess of the 1,000,000 GIDs. In some examples, the allocation of the additional GIDs in the another range of GIDs is dynamic because the allocation may occur on a per-share, per-file-share, per-file server, and/or per-domain basis. In some examples, the allocation of the additional GIDs in the another range of GIDs is dynamic because the another range is allocated responsive to a determination that there exist additional local users in the first domain that exceed the initial 1,000,000 allocated to the first domain in the first range.

In some examples, the another range of GIDs dynamically added to the first domain range from GIDs 2,000,001-3,000,000. In this way, the additionally allocated GIDs remain unique, as each GID within the dynamically allocated another range is different from the GIDs allocated in the first range to the first domain and the GIDs allocated in the second range to the second domain. In this way, the GIDs are allocated to trusted domains subscribed to by the virtualized file server, and the GIDs are globally unique across domains.

In some examples, and as described herein, the mapping between local user SIDs in the trusted domain to a respective file server user ID within the range of file server user IDs may be accessible to each distributed file server that services the trusted domain. In some examples, this mapping may be accessible because it is stored in a database accessible to one or more of the distributed file servers. In some examples, this mapping may be accessible because it is stored in a distributed database. In some examples, this mapping may be accessible because it is stored in a range mapping information database, such as range mapping information 150 of FIG. 1.

In some examples, and as described herein, the mapping between the number of local user SIDs that exceed the number of file server user IDs allocated to the trusted domain, and the another range of file server user IDs, may be accessible to each distributed file server that services the trusted domain. In some examples, this mapping may be accessible because it is stored in a database accessible to one or more of the distributed file servers. In some examples, this mapping may be accessible because it is stored in a distributed database. In some examples, this mapping may be accessible because it is stored in a range mapping information database, such as range mapping information 150 of FIG. 1.

In some examples, a virtualized file server, such as virtualized file server 106 of FIG. 1, may be used to implement one or more cross-file server policies. A cross-file server policy may generally refer to a policy that accesses and/or utilizes more than one file server in implementing the policy. For example, one virtualized file server may be used (e.g., designated) as a destination file server and another virtualized file server (not shown) may be used (e.g., designated) as a source file server. For example, virtualized file server 106 may be designated as a source file server and another virtualized file server may be designated as a destination file server. Virtualized file server 106 may then be utilized to replicate, backup, provide redundancy for, or otherwise receive data from one or more other virtualized file server(s). For example, virtualized file server 106 may implement a replication policy from virtualized file server 106 to another virtualized file server (not shown). In some examples, the virtualized file server 106 may be used to implement a replication policy to additional and/or alternative virtualized file server(s), directly.

Examples of virtualized file servers which may be used to implement systems described herein are also described in U.S. published application 2023/0056425 A1, published on Feb. 23, 2023, which application is hereby incorporated by reference in its entirety for any purpose. Examples of virtualized file servers which may be used to implement systems described herein are also described in U.S. published application 2023/0237170 A1, published on Jul. 27, 2023, which application is hereby incorporated by reference in its entirety for any purpose.

Turning now to FIG. 2. FIG. 2 is a flowchart of method 200 for generating consistent file server user identifiers (IDs) within a distributed file server environment and across domains, arranged in accordance with examples described herein. This method 200 may be implemented, for example, using one or more systems described herein, such as system 100.

Method 200 includes scanning for one or more domains, including a domain a distributed file server is subscribed to and trusted domains of the one or more of domains at block 202, allocating a range of file server user identifier (IDs) for each of the one or more domains at block 204, storing a mapping between security identifiers (SIDs) in each domain of the one or more domains to a respective file server user ID within each respective range of file server user IDs at block 206, and providing the mapping to a replication target for the distributed file server at block 208.

Block 202 recites scanning for one or more domains, including a domain a distributed file server is subscribed to and trusted domains of the one or more of domains. In some examples, a virtualized file server, such as virtualized file server 106 of FIG. 1, may be configured to scan for one or more domains, such as domain 142, domain 146, and/or domain 148 of system 100 of FIG. 1. In some examples, one or more virtualized file servers, such as virtualized file server 106, may be subscribed to one or more of domain 142, domain 146, and/or domain 148. In some examples, a trusted domain identified by virtualized file server 106 may be an Active Directory domain. Scanning for one or more domains may include accessing metadata of the virtualized file server 106 and/or a domain that the virtualized file server 106 is subscribed to. For example, the ID allocator 114 may access metadata of the virtualized file server 106 and may determine that the virtualized file server 106 is subscribed to domain 146. The ID allocator 114 may access metadata of the virtualized file server 106 and/or metadata of the domain 146 to identify additional domains in a trusted relationship with the subscribed domain. For example, the ID allocator 114 may identify that domains 142 and/or 148 are in a trusted relationship with the domain 146.

Block 204 recites allocating a range of file server user identifier (IDs) for each of the one or more domains. In some examples, a virtualized file server, such as virtualized file server 106 of FIG. 1, may be configured to allocate, to the identified trusted domain, a range of file server user identifiers (IDs) (e.g., GIDs). In some examples, every file server user ID in the range of file server user IDs is a GID. In some examples, and as described herein, virtualized file server 106 may allocate a first range of file server user IDs (e.g., GIDs) to a first domain, such as domain 146 of FIG. 1. In some examples, and as described herein, virtualized file server 106 may allocate a second range of file server user IDs (e.g., GIDs) to a second domain, such as domain 148 of FIG. 1. In some examples, the GIDs in the first range allocated to the first domain are different from the GIDs in the second range allocated to the second domain.

Block 206 recites storing a mapping between local user security identifiers (local user SIDs) in each domain of the one or more domains to a respective file server user ID within each respective range of file server user IDs. In some examples, a virtualized file server, such as virtualized file server 106 of FIG. 1, may store a mapping between local user security identifiers (SIDs) in the trusted domain, including each respective security identifier, to a respective file server user ID within the range of file server user IDs. In some examples, data and/or metadata associated with and/or corresponding to the mapping between local user security identifiers (SIDs) in the trusted domain and a respective file server user ID (e.g., GID) may be stored in one or more databases (e.g., a distributed database). In some examples, data and/or metadata associated with and/or corresponding to the mapping between local user security identifiers (SIDs) in the trusted domain and a respective file server user ID (e.g., GID) may be stored in range mapping information 150 of FIG. 1.

Block 208 recites providing the mapping to a replication target for the distributed file server. In some examples, a virtualized file server, such as virtualized file server 106 of FIG. 1, may provide the mapping to a replication target for the distributed file server. As described herein, in some examples, the replication target for the file server (e.g., distributed file server) is a destination target, and, in some examples, the replication target for the file server (e.g., distributed file server) is a disaster recovery target. In some examples, a virtualized file server, such as virtualized file server 106, may provide the mapping to the replication target for the distributed file server responsive to the occurrence of a disaster recovery event, a replication event, or a combination thereof.

Turning now to FIG. 3, FIG. 3 is a flowchart of method 300 for generating consistent file server user identifiers (IDs) within a distributed file server environment and across domains, arranged in accordance with examples described herein. This method 300 may be implemented, for example, using one or more systems described herein, such as system 100.

Method 300 includes scanning for a plurality of domains, including a domain a distributed file server is subscribed to and trusted domains of the plurality of domains at block 302, identifying a trusted domain of the plurality of domains, wherein the trusted domain is associated with one or more users, each of the one or more users having a respective security identifier at block 304, allocating, for the trusted domain, a range of file server user identifiers (IDs) at block

306, storing a mapping between security identifiers (SIDs) in the trusted domain, including each respective security identifier, to a respective file server user ID within the range of file server user IDs at block 308, and providing the mapping to a replication target for the distributed file server at block 310.

Block 302 recites scanning for a plurality of domains, including a domain a distributed file server is subscribed to and trusted domains of the plurality of domains. In some examples, virtualized file server 106 of FIG. 1 (e.g., using ID allocator 114 and/or ID allocation process 926 of FIG. 9) may scan for each domain of the plurality of domains, such as domain 142, domain 146, and domain 148 of system 100 of FIG. 1. In some examples, each domain of the plurality of domains may be subscribed to by a distributed file server(s), such as virtualized file server 106. In some examples, at least one scanned domain may be a trusted domain. In some examples, the trusted domain identified by the virtualized file server may be an Active Directory domain.

Block 304 recites identifying a trusted domain of the plurality of domains, wherein the trusted domain is associated with one or more users, each of the one or more users having a respective security identifier. In some examples, virtualized file server 106 of FIG. 1 may identify a trusted domain of the plurality of domains scanned. In some examples, the identified trusted domain may be associated with one or more local users, each local user associated with a local user SID. In some examples, each SID associated with a local user may comprise a domain-specific portion, a file server specific portion, and/or a relative user identifier (RID) portion. In some examples, a local user SID may comprise "SID-1-2-xxx-yyy."

Block 306 recites allocating, for the trusted domain, a range of file server user identifiers (IDs). In some examples, virtualized file server 106 of FIG. 1 may allocate to the identified trusted domain, a range of file server user identifiers (IDs) (e.g., GIDs). In some examples, virtualized file server 106 may allocate a first range of file server user IDs (e.g., GIDs) to a first domain, such as domain 142 of FIG. 1. In some examples, virtualized file server 106 may allocate a second range of file server user IDs (e.g., GIDs) to a second domain, such as domain 146 of FIG. 1. In some examples, virtualized file server 106 may allocate a third range of file server user IDs (e.g., GIDs) to a third domain, such as domain 148 of FIG. 1. In some examples, virtualized file server 106 of FIG. 1 may dynamically allocate to the identified trusted domain, one or more additional ranges of GIDs, in addition to the already-allocated first, second, and third ranges. In some examples, the dynamic allocation may be on a per-file, per-file-share, per-share, per-file server, and/or per-domain basis. In some examples, the GIDs in each allocated range are unique to themselves.

Block 308 recites storing a mapping between security identifiers (SIDs) in the trusted domain, including each respective security identifier, to a respective file server user ID within the range of file server user IDs. In some examples, virtualized file server 106 of FIG. 1 may store a mapping between local user security identifiers (SIDs) in the trusted domain, including each respective security identifier, to a respective file server user ID within the range of file server user IDs. In some examples, data and/or metadata associated with and/or corresponding to the mapping between local user security identifiers (SIDs) in the trusted domain and a respective file server user ID (e.g., GID) may be stored in one or more databases (e.g., a distributed database), such as range mapping information 150 of FIG. 1.

Block 310 recites providing the mapping to a replication target for the distributed file server. In some examples, virtualized file server 106 of FIG. 1 may provide the mapping to a replication target for the distributed file server. In some examples, the replication target for the file server (e.g., distributed file server) is a destination target. In some examples, the replication target for the file server (e.g., distributed file server) is a disaster recovery target. In some examples, virtualized file server 106 may provide the mapping to the replication target for the distributed file server responsive to the occurrence of a disaster recovery event, a failover event, or a combination thereof. In some examples, when a file server share is failed over from one file server (e.g., a source file server; an source virtualized file server) to another file server (e.g., a target file server and/or a replication file sever; a target virtualized file server), the failover functionality on the source file server may be configured to take care of copying the requested database to the target file sever as part of failover. In some examples, when failback from the target file server to the source file server occurs, the target file server may be configured to take care of copying the distributed database to the source file server.

Figure 4:
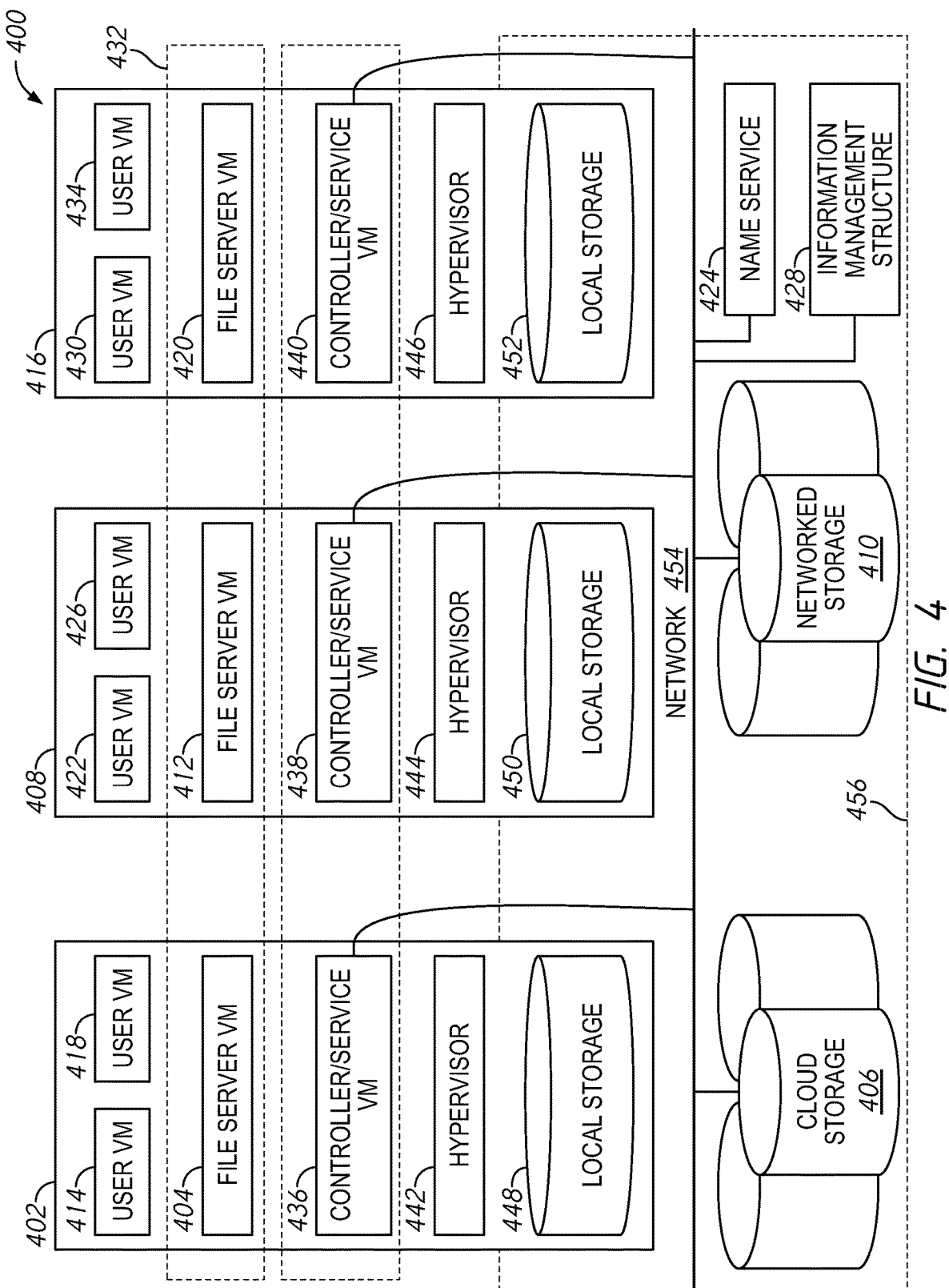
FIG. 4 is a schematic illustration of a clustered virtualization environment 400 implementing a virtualized file server and across domains, arranged in accordance with examples described herein.

FIG. 4 is a schematic illustration of a clustered virtualization environment 400 implementing a virtualized file server (VFS 432) according to particular embodiments. In particular embodiments, the VFS 432 provides file services to user VMs 414, 418, 422, 426, 430, and 434. Each user VM may be a client as used herein. The file services may include storing and retrieving data persistently, reliably, and efficiently. The user virtual machines may execute user processes, such as office applications or the like, on host machines 402, 408, and 416. The stored data may be represented as a set of storage items, such as files organized in a hierarchical structure of folders (also known as directories), which can contain files and other folders, and shares, which can also contain files and folders.

The clustered virtualization environment 400 and/or VFS 432 may be used to implement one or more virtualization platforms and/or virtualized file servers described herein, such as the virtualized file server 106 of FIG. 1 and/or any other virtualized file server described herein.

The architectures of FIG. 4 can be implemented for a distributed platform that contains multiple host machines 402, 416, and 408 that manage multiple tiers of storage. The multiple tiers of storage may include storage that is accessible through network 454, such as, by way of example and not limitation, cloud storage 406 (e.g., which may be accessible through the Internet), network-attached storage 410 (NAS) (e.g., which may be accessible through a local area network (LAN)), or a storage area network (SAN). Examples described herein also permit local storage 448, 450, and 452 that is incorporated into or directly attached to the host machine and/or appliance to be managed as part of storage pool 456. Examples of such local storage include solid state drives (SSDs), hard disk drives (HDDs), optical disk drives, external drives (e.g., a storage device connected to a host machine via a native drive interface or a serial attached small computer system interface (SCSI)), or any other direct-attached storage. These storage devices, both direct-attached and network-accessible, collectively form storage pool 456. Virtual disks (or "vDisks") may be structured from the physical storage devices in storage pool 456. As used herein, the term vDisk refers to the storage abstraction that is exposed by a component of the virtualization platform, such as a controller/service VM (CVM) (e.g., CVM 436) and/or a hypervisor or other storage controller to be used by a user VM (e.g., user VM 414). In particular embodiments, the vDisk may be exposed via iSCSI ("internet small computer system interface") or NFS ("network file system") and is mounted as a virtual disk on the user VM. In particular embodiments, vDisks may be organized into one or more volume groups (VGs).

Each host machine 402, 416, and 408 may run virtualization software, such as VMWARE ESX (I), MICROSOFT HYPER-V, or REDHAT KVM. The virtualization software includes hypervisors 442, 444, and 446 to create, manage, and destroy user VMs, as well as managing the interactions between the underlying hardware and user VMs. User VMs may run one or more applications that may operate as "clients" with respect to other elements within clustered virtualization environment 400. A hypervisor may connect to network 454. In particular embodiments, a host machine 402, 408, or 416 may be a physical hardware computing device; in particular embodiments, a host machine 402, 408, or 416 may be a virtual machine.

CVMs 436, 438, and 440 are used to manage storage and input/output (I/O) activities according to particular embodiments. These special VMs act as the storage controller in the currently described architecture. Multiple such storage controllers may coordinate within a cluster to form a unified storage controller system. CVMs may run as virtual machines on the various host machines, and work together to form a distributed system that manages all the storage resources, including local storage, network-attached storage 410, and cloud storage 406. The CVMs may connect to network 454 directly, or via a hypervisor. Since the CVMs run independent of hypervisors 442, 444, and 446, this means that the current approach can be used and implemented within any virtual machine architecture, since the CVMs of particular embodiments can be used in conjunction with any hypervisor from any virtualization vendor. In some examples, CVMs may not be used and one or more hypervisors (e.g., hypervisors 442, 444, and/or 446) may perform the functions described with respect to the CVMs. In some examples, one or more CVMs may not be present, and the hypervisor or other component hosted on the computing nodes may provide the functions attributed to the CVM herein.

A host machine may be designated as a leader node within a cluster of host machines. For example, host machine 408 may be a leader node. A leader node may have a software component designated to perform operations of the leader. For example, CVM 438 on host machine 408 may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node and/or in communication with the leader node or virtual machines or containers on the leader node. For example, virtualized file servers described herein may be in communication with the leader node in some examples.

Each CVM 436, 438, and 440 exports one or more block devices or NFS server targets that appear as disks to user VMs 414, 418, 422, 426, 430, and 434. These disks are virtual, since they are implemented by the software running inside CVMs 436, 438, and 440. Thus, to user VMs, CVMs appear to be exporting a clustered storage appliance that contains some disks. All user data (including the operating system) in the user VMs may reside on these virtual disks.

Significant performance advantages can be gained by allowing the virtualization system to access and utilize local storage 448, 450, and 452 as disclosed herein. This is because I/O performance is typically much faster when performing access to local storage as compared to performing access to network-attached storage 410 across a network 454. This faster performance for locally attached storage can be increased even further by using certain types of optimized local storage devices, such as SSDs. Further details regarding methods and mechanisms for implementing the virtualization environment illustrated in FIG. 4 are described in U.S. Pat. No. 8,601,473, which is hereby incorporated by reference in its entirety.

As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command, and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 456. Additionally or alternatively, CVMs 436, 438, and 440 may present an emulated storage controller either to the hypervisor or to user VMs to facilitate I/O operations. CVMs 436, 438, and 440 may be connected to storage within storage pool 456. CVM 436 may have the ability to perform I/O operations using local storage 448 within the same host machine 402, by connecting via network 454 to cloud storage 406 or network-attached storage 410, or by connecting via network 454 to local storage 450 or 452 within another host machine 408 or 416 (e.g., via connecting to another CVM 438 or 440). In particular embodiments, any suitable computing system may be used to implement a host machine.

In particular embodiments, the VFS 432 may include a set of FSVMs 404, 412, and 420 that execute on host machines 402, 408, and 416 and process storage item access operations requested by user VMs executing on the host machines 402, 408, and 416. The FSVMs 404, 412, and 420 may communicate with storage controllers provided by CVMs 436, 438, and 440 and/or hypervisors executing on the host machines 402, 408, and 416 to store and retrieve files, folders, SMB shares, or other storage items on local storage 448, 450, and 452 associated with, e.g., local to, the host machines 402, 408, and 416. The FSVMs 404, 412, and 420 may store and retrieve block-level data on the host machines 402, 408, and 416, e.g., on the local storage 448, 450, and 452 of the host machines 402, 408, and 416. The block-level data may include block-level representations of the storage items (e.g., files). The network protocol used for communication between user VMs, FSVMs, and CVMs via the network 454 may be Internet Small Computer Systems Interface (iSCSI), Server Message Block (SMB), Network File System (NFS), pNFS (Parallel NFS), or another appropriate protocol.

For the purposes of VFS 432, host machine 416 may be designated as a leader node within a cluster of host machines. In this case, FSVM 420 on host machine 416 may be designated to perform such operations. A leader may be responsible for monitoring or handling requests from FSVMs on other host machines throughout the virtualized environment. If FSVM 420 fails, a new leader may be designated for VFS 432.

In particular embodiments, the user VMs may send data to the VFS 432 (e.g., to the FSVMs) using write requests, and may receive data from it using read requests. The read and write requests, and their associated parameters, data, and results, may be sent between a user VM and one or more file server VMs (FSVMs) located on the same host machine as the user VM or on different host machines from the user VM. The read and write requests may be sent between host machines 402, 408, and 416 via network 454, e.g., using a network communication protocol such as iSCSI, CIFS, SMB, TCP, IP, or the like. When a read or write request is sent between two VMs located on the same one of the host machines 402, 408, or 416 (e.g., between the user VM 414 and the FSVM 404 located on the host machine 402), the request may be sent using local communication within the host machine 402 instead of via the network 454. As described above, such local communication may be substantially faster than communication via the network 454. The local communication may be performed by, e.g., writing to and reading from shared memory accessible by the user VM 414 and the FSVM 404, sending and receiving data via a local "loopback" network interface, local stream communication, or the like.

In particular embodiments, the storage items stored by the VFS 432, such as files and folders, may be distributed amongst multiple FSVMs 404, 412, and 420. In particular embodiments, when storage access requests are received from the user VMs, the VFS 432 identifies FSVMs 404, 412, and 420 at which requested storage items, e.g., folders, files, or portions thereof, are stored, and directs the user VMs to the locations of the storage items. The FSVMs 404, 412, and 420 may maintain a storage map, such as a sharding map, that maps names or identifiers of storage items to their corresponding locations. The storage map may be a distributed data structure of which copies are maintained at each FSVM 404, 412, and 420 and accessed using distributed locks or other storage item access operations. Alternatively, the storage map may be maintained by an FSVM at a leader node such as the FSVM 420, and the other FSVMs 404 and 412 may send requests to query and update the storage map to the leader FSVM 420. Other implementations of the storage map are possible using appropriate techniques to provide asynchronous data access to a shared resource by multiple readers and writers. The storage map may map names or identifiers of storage items in the form of text strings or numeric identifiers, such as folder names, files names, and/or identifiers of portions of folders or files (e.g., numeric start offset positions and counts in bytes or other units) to locations of the files, folders, or portions thereof. Locations may be represented as names of FSVMs, e.g., "FSVM-1," as network addresses of host machines on which FSVMs are located (e.g., "ip-addr1" or "128.1.1.10"), or as other types of location identifiers.

When a user application executing in a user VM 414 on one of the host machines 402 initiates a storage access operation, such as reading or writing data, the user VM 414 may send the storage access operation in a request to one of the FSVMs 404, 412, or 420 on one of the host machines 402, 408, or 416. A FSVM 412 executing on a host machine 408 that receives a storage access request may use the storage map to determine whether the requested file or folder is located on the FSVM 412. If the requested file or folder is located on the FSVM 412, the FSVM 412 executes the requested storage access operation. Otherwise, the FSVM 412 responds to the request with an indication that the data is not on the FSVM 412, and may redirect the requesting user VM 414 to the FSVM on which the storage map indicates the file or folder is located. The client may cache the address of the FSVM on which the file or folder is located, so that it may send subsequent requests for the file or folder directly to that FSVM.

As an example and not by way of limitation, the location of a file or a folder may be pinned to a particular FSVM 404 by sending a file service operation that creates the file or folder to a CVM 436 and/or hypervisor 442 associated with (e.g., located on the same host machine as) the FSVM 404. The CVM 436 subsequently processes file service commands for that file for the FSVM 404 and sends corresponding storage access operations to storage devices associated with the file. The CVM 436 may associate local storage 448 with the file if there is sufficient free space on local storage 448. Alternatively, the CVM 436 may associate a storage device located on another host machine 402, e.g., in local storage 450, with the file under certain conditions, e.g., if there is insufficient free space on the local storage 448, or if storage access operations between the CVM 436 and the file are expected to be infrequent. Files and folders, or portions thereof, may also be stored on other storage devices, such as the network-attached storage (NAS) network-attached storage 410, or the cloud storage 406 of the storage pool 456.

In particular embodiments, a name service 424, such as that specified by the domain name system (DNS) internet protocol, may communicate with the host machines 402, 408, and 416 via the network 454 and may store a database of domain name (e.g., host name) to IP address mappings. The domain names may correspond to FSVMs, e.g., fsvm1.domain.com or ip-addr1.domain.com for an FSVM named FSVM-1. The name service 424 may be queried by the user VMs to determine the IP address of a particular host machine 402, 408, and 416 given a name of the host machine, e.g., to determine the IP address of the host name ip-addr1 for the host machine 402. The name service 424 may be located on a separate server computer system or on one or more of the host machines 402, 408, and 416. The names and IP addresses of the host machines of the VFS 432, e.g., the host machines 402, 408, and 416, may be stored in the name service 424 so that the user VMs may determine the IP address of each of the host machines 402, 408, and 416, or FSVMs 404, 412, and 420. The name of each VFS instance, e.g., each file system such as FS1, FS2, or the like, may be stored in the name service 424 in association with a set of one or more names that contains the name(s) of the host machines 402, 408, and 416 or FSVMs 404, 412, and 420 of the VFS instance VFS 432. The FSVMs 404, 412, and 420 may be associated with the host names ip-addr1, ip-addr2, and ip-addr3, respectively. For example, the file server instance name FS1.domain.com may be associated with the host names ip-addr1, ip-addr2, and ip-addr3 in the name service 424, so that a query of the name service 424 for the server instance name "FS1" or "FS1.domain.com" returns the names ip-addr1, ip-addr2, and ip-addr3. As another example, the file server instance name FS1.domain.com may be associated with the host names fsvm-1, fsvm-2, and fsvm-3. Further, the name service 424 may return the names in a different order for each name lookup request, e.g., using round-robin ordering, so that the sequence of names (or addresses) returned by the name service for a file server instance name is a different permutation for each query until all the permutations have been returned in response to requests, at which point the permutation cycle starts again, e.g., with the first permutation. In this way, storage access requests from user VMs may be balanced across the host machines, since the user VMs submit requests to the name service 424 for the address of the VFS instance for storage items for which the user VMs do not have a record or cache entry, as described below.

In particular embodiments, each FSVM may have two IP addresses: an external IP address and an internal IP address. The external IP addresses may be used by SMB/CIFS clients, such as user VMs, to connect to the FSVMs. The external IP addresses may be stored in the name service 424. The IP addresses ip-addr1, ip-addr2, and ip-addr3 described above are examples of external IP addresses. The internal IP addresses may be used for iSCSI communication to CVMs and/or hypervisors, e.g., between the FSVMs 404, 412, and 420 and the CVMs 436, 438, and 440 and/or hypervisors 442, 444, and/or 446. Other internal communications may be sent via the internal IP addresses as well, e.g., file server configuration information may be sent from the CVMs to the FSVMs using the internal IP addresses, and the CVMs may get file server statistics from the FSVMs via internal communication as needed.

Since the VFS 432 is provided by a distributed set of FSVMs 404, 412, and 420, the user VMs that access particular requested storage items, such as files or folders, do not necessarily know the locations of the requested storage items when the request is received. A distributed file system protocol, e.g., MICROSOFT DFS (distributed file system), or the like, is therefore used, in which a user VM 414 may request the addresses of FSVMs 404, 412, and 420 from a name service 424 (e.g., DNS). The name service 424 may send one or more network addresses of FSVMs 404, 412, and 420 to the user VM 414, in an order that changes for each subsequent request. These network addresses are not necessarily the addresses of the FSVM 412 on which the storage item requested by the user VM 414 is located, since the name service 424 does not necessarily have information about the mapping between storage items and FSVMs 404, 412, and 420. Next, the user VM 414 may send an access request to one of the network addresses provided by the name service, e.g., the address of FSVM 412. The FSVM 412 may receive the access request and determine whether the storage item identified by the request is located on the FSVM 412. If so, the FSVM 412 may process the request and send the results to the requesting user VM 414. However, if the identified storage item is located on a different FSVM 420, then the FSVM 412 may redirect the user VM 414 to the FSVM 420 on which the requested storage item is located by sending a "redirect" response referencing FSVM 420 to the user VM 414. The user VM 414 may then send the access request to FSVM 420, which may perform the requested operation for the identified storage item.

A particular virtualized file server, such as VFS 432, including the items it stores, e.g., files and folders, may be referred to herein as a VFS "instance" and/or a file system and may have an associated name, e.g., FS1, as described above. Although a VFS instance may have multiple FSVMs distributed across different host machines, with different files being stored on FSVMs, the VFS instance may present a single name space to its clients such as the user VMs. The single name space may include, for example, a set of named "shares" and each share may have an associated folder hierarchy in which files are stored. Storage items such as files and folders may have associated names and metadata such as permissions, access control information, size quota limits, file types, files sizes, and so on. As another example, the name space may be a single folder hierarchy, e.g., a single root directory that contains files and other folders. User VMs may access the data stored on a distributed VFS instance via storage access operations, such as operations to list folders and files in a specified folder, create a new file or folder, open an existing file for reading or writing, and read data from or write data to a file, as well as storage item manipulation operations to rename, delete, copy, or get details, such as metadata, of files or folders. Note that folders may also be referred to herein as "directories."

In particular embodiments, storage items such as files and folders in a file server namespace may be accessed by clients such as user VMs by name, e.g., "\Folder-1\File-1" and "\Folder-2\File-2" for two different files named File-1 and File-2 in the folders Folder-1 and Folder-2, respectively (where Folder-1 and Folder-2 are sub-folders of the root folder). Names that identify files in the namespace using folder names and file names may be referred to as "path names." Client systems may access the storage items stored on the VFS instance by specifying the file names or path names, e.g., the path name "\Folder-1\File-1," in storage access operations. If the storage items are stored on a share (e.g., a shared drive), then the share name may be used to access the storage items, e.g., via the path name "\\Share-1\Folder-1\File-1" to access File-1 in folder Folder-1 on a share named Share-1.

In particular embodiments, although the VFS instance may store different folders, files, or portions thereof at different locations, e.g., on different FSVMs, the use of different FSVMs or other elements of storage pool 456 to store the folders and files may be hidden from the accessing clients. The share name is not necessarily a name of a location such as an FSVM or host machine. For example, the name Share-1 does not identify a particular FSVM on which storage items of the share are located. The share Share-1 may have portions of storage items stored on three host machines, but a user may simply access Share-1, e.g., by mapping Share-1 to a client computer, to gain access to the storage items on Share-1 as if they were located on the client computer. Names of storage items, such as file names and folder names, are similarly location-independent. Thus, although storage items, such as files and their containing folders and shares, may be stored at different locations, such as different host machines, the files may be accessed in a location-transparent manner by clients (such as the user VMs). Thus, users at client systems need not specify or know the locations of each storage item being accessed. The VFS may automatically map the file names, folder names, or full path names to the locations at which the storage items are stored. As an example and not by way of limitation, a storage item's location may be specified by the name, address, or identity of the FSVM that provides access to the storage item on the host machine on which the storage item is located. A storage item such as a file may be divided into multiple parts that may be located on different FSVMs, in which case access requests for a particular portion of the file may be automatically mapped to the location of the portion of the file based on the portion of the file being accessed (e.g., the offset from the beginning of the file and the number of bytes being accessed).

In particular embodiments, VFS 432 determines the location, e.g., FSVM, at which to store a storage item when the storage item is created. For example, a FSVM 404 may attempt to create a file or folder using a CVM 436 on the same host machine 402 as the user VM 418 that requested creation of the file, so that the CVM 436 that controls access operations to the file folder is co-located with the user VM 418. In this way, since the user VM 418 is known to be associated with the file or folder and is thus likely to access the file again, e.g., in the near future or on behalf of the same user, access operations may use local communication or short-distance communication to improve performance, e.g., by reducing access times or increasing access throughput. If there is a local CVM on the same host machine as the FSVM, the FSVM may identify it and use it by default. If there is no local CVM on the same host machine as the FSVM, a delay may be incurred for communication between the FSVM and a CVM on a different host machine. Further, the VFS 432 may also attempt to store the file on a storage device that is local to the CVM being used to create the file, such as local storage, so that storage access operations between the CVM and local storage may use local or short-distance communication.

In particular embodiments, if a CVM is unable to store the storage item in local storage of a host machine on which an FSVM resides, e.g., because local storage does not have sufficient available free space, then the file may be stored in local storage of a different host machine. In this case, the stored file is not physically local to the host machine, but storage access operations for the file are performed by the locally associated CVM and FSVM, and the CVM may communicate with local storage on the remote host machine using a network file sharing protocol, e.g., iSCSI, SAMBA, or the like.

In particular embodiments, if a virtual machine, such as a user VM 414, CVM 436, or FSVM 404, moves from a host machine 402 to a destination host machine 408, e.g., because of resource availability changes, and data items such as files or folders associated with the VM are not locally accessible on the destination host machine 408, then data migration may be performed for the data items associated with the moved VM to migrate them to the new host machine 408, so that they are local to the moved VM on the new host machine 408. FSVMs may detect removal and addition of CVMs (as may occur, for example, when a CVM fails or is shut down) via the iSCSI protocol or other technique, such as heartbeat messages. As another example, a FSVM may determine that a particular file's location is to be changed, e.g., because a disk on which the file is stored is becoming full, because changing the file's location is likely to reduce network communication delays and therefore improve performance, or for other reasons. Upon determining that a file is to be moved, VFS 432 may change the location of the file by, for example, copying the file from its existing location(s), such as local storage 448 of a host machine 402, to its new location(s), such as local storage 450 of host machine 408 (and to or from other host machines, such as local storage 452 of host machine 416 if appropriate), and deleting the file from its existing location(s). Write operations on the file may be blocked or queued while the file is being copied, so that the copy is consistent. The VFS 432 may also redirect storage access requests for the file from an FSVM at the file's existing location to a FSVM at the file's new location.

In particular embodiments, VFS 432 includes at least three FSVMs 404, 412, and 420 located on three respective host machines 402, 408, and 416. To provide high availability, there may be a maximum of one FSVM for a particular VFS instance VFS 432 per host machine in a cluster. If two FSVMs are detected on a single host machine, then one of the FSVMs may be moved to another host machine automatically, or the user (e.g., system administrator and/or virtualized file server) may be notified to move the FSVM to another host machine. The user and/or virtualized file server may move a FSVM to another host machine using an administrative interface that provides commands for starting, stopping, and moving FSVMs between host machines.

In particular embodiments, two FSVMs of different VFS instances may reside on the same host machine. If the host machine fails, the FSVMs on the host machine become unavailable, at least until the host machine recovers. Thus, if there is at most one FSVM for each VFS instance on each host machine, then at most one of the FSVMs may be lost per VFS per failed host machine. As an example, if more than one FSVM for a particular VFS instance were to reside on a host machine, and the VFS instance includes three host machines and three FSVMs, then loss of one host machine would result in loss of two-thirds of the FSVMs for the VFS instance, which would be more disruptive and more difficult to recover from than loss of one-third of the FSVMs for the VFS instance.

In particular embodiments, users, such as system administrators or other users of the user VMs, may expand the cluster of FSVMs by adding additional FSVMs. Each FSVM may be associated with at least one network address, such as an IP (Internet Protocol) address of the host machine on which the FSVM resides. There may be multiple clusters, and all FSVMs of a particular VFS instance are ordinarily in the same cluster. The VFS instance may be a member of a MICROSOFT ACTIVE DIRECTORY domain, which may provide authentication and other services such as name service.

Figure 5:
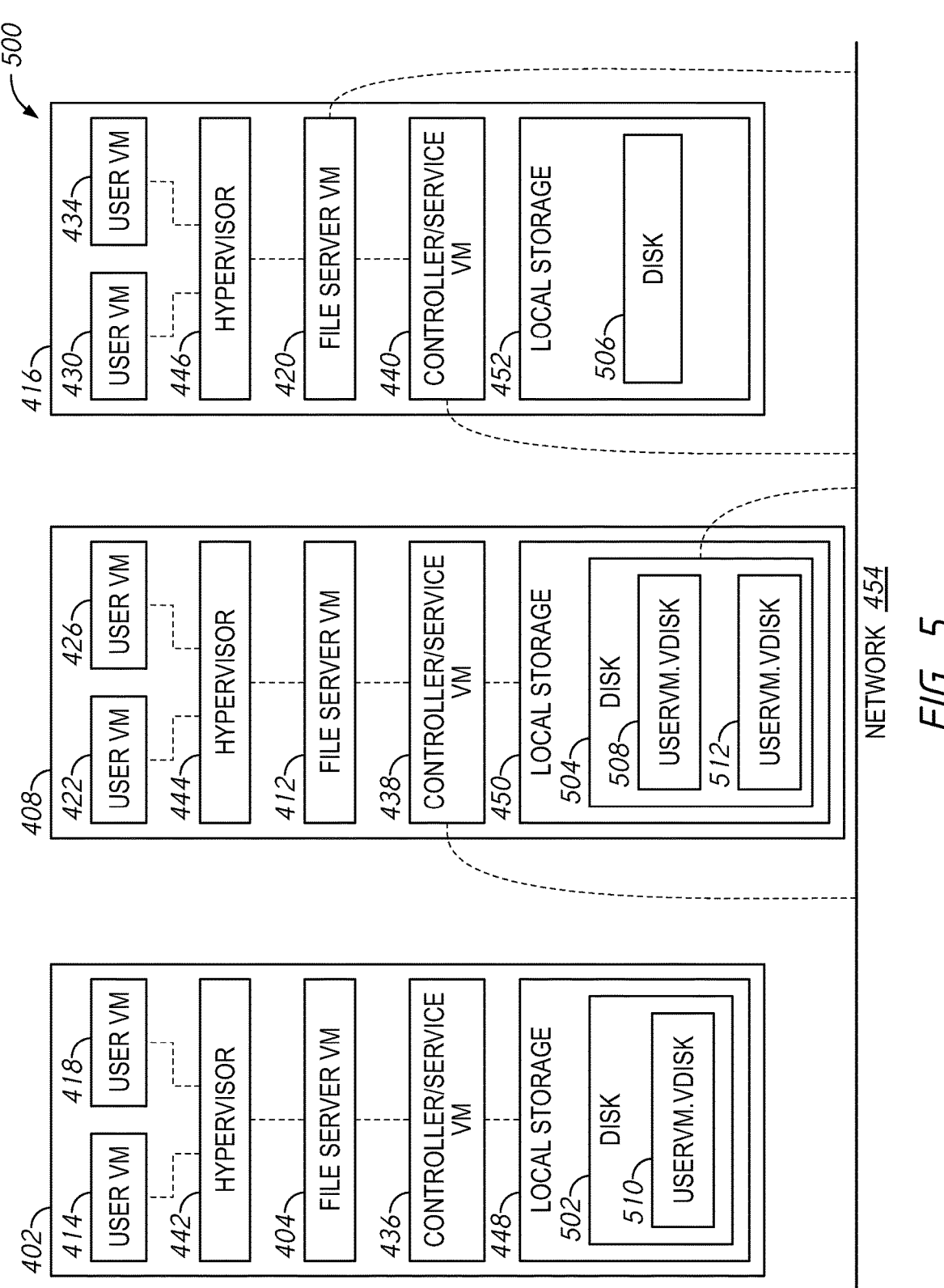
FIG. 5 is a schematic illustration of a clustered virtualization environment 500, arranged in accordance with examples described herein.

FIG. 5 illustrates schematic illustration of a clustered virtualization environment 500 implementing a VFS instance (e.g., VFS 432) in which stored items such as files and folders used by user VMs are stored locally on the same host machines as the user VMs according to particular embodiments. As described above, one or more user VMs and a controller/service VM and/or hypervisor may run on each host machine along with a hypervisor. As a user VM processes I/O commands (e.g., a read or write operation), the I/O commands may be sent to the hypervisor on the same server or host machine as the user VM. For example, the hypervisor may present to the user VMs a VFS instance, receive an I/O command, and facilitate the performance of the I/O command by passing the command to a FSVM that performs the operation specified by the command. The VFS may facilitate I/O operations between a user VM and a virtualized file system. The virtualized file system may appear to the user VM as a namespace of mappable shared drives or mountable network file systems of files and directories. The namespace of the virtualized file system may be implemented using storage devices in the local storage, such as disks, onto which the shared drives or network file systems, files, and folders, or portions thereof, may be distributed as determined by the FSVMs. The VFS may thus provide features disclosed herein, such as efficient use of the disks, high availability, scalability, and others. The implementation of these features may be transparent to the user VMs. The FSVMs may present the storage capacity of the disks of the host machines as an efficient, highly available, and scalable namespace in which the user VMs may create and access shares, files, folders, and the like.

As an example, a network share may be presented to a user VM as one or more discrete virtual disks, but each virtual disk may correspond to any part of one or more virtual or physical disks within a storage pool. Additionally or alternatively, the FSVMs may present a VFS either to the hypervisor or to user VMs of a host machine to facilitate I/O operations. The FSVMs may access the local storage via controller/service VMs, other storage controllers, hypervisors, or other components of the host machine. As described herein, a CVM 436 may have the ability to perform I/O operations using local storage 448 within the same host machine 402 by connecting via the network 454 to cloud storage or NAS, or by connecting via the network 454 to 450, or 452 within another host machine 408, 416 (e.g., by connecting to another CVM 438, 440).

In particular embodiments, each user VM may access one or more virtual disk images stored on one or more disks of the local storage, the cloud storage, and/or the NAS. The virtual disk images may contain data used by the user VMs, such as operating system images, application software, and user data, e.g., user home folders and user profile folders. For example, FIG. 5 illustrates three virtual machine images 510, 508, and 512. The virtual machine image 510 may be a file named UserVM.vmdisk (or the like) stored on disk 502 of local storage 448 of host machine 402. The virtual machine image 510 may store the contents of the user VM 414's hard drive. The disk 502 on which the virtual machine image 510 is "local to" the user VM 414 on host machine 402 because the disk 502 is in local storage 448 of the host machine 402 on which the user VM 414 is located. Thus, the user VM 414 may use local (intra-host machine) communication to access the virtual machine image 510 more efficiently, e.g., with less latency and higher throughput, than would be the case if the virtual machine image 510 were stored on disk 504 of local storage 450 of a different host machine 408, because inter-host machine communication across the network 454 would be used in the latter case. Similarly, a virtual machine image 508, which may be a file named UserVM.vmdisk (or the like), is stored on disk 504 of local storage 450 of host machine 408, and the image 508 is local to the user VM 422 located on host machine 408. Thus, the user VM 422 may access the virtual machine image 508 more efficiently than the virtual machine 418 on host machine 402, for example. In another example, the CVM 440 may be located on the same host machine 416 as the user VM 430 that accesses a virtual machine image 512 (UserVM.vmdisk) of the user VM 430, with the virtual machine image file 512 being stored on a different host machine 408 than the user VM 430 and the CVM 440. In this example, communication between the user VM 430 and the CVM 440 may still be local, e.g., more efficient than communication between the user VM 430 and a CVM 438 on a different host machine 408, but communication between the CVM 440 and the disk 504 on which the virtual machine image 512 is stored is via the network 454, as shown by the dashed lines between CVM 440 and the network 454 and between the network 454 and local storage 450. The communication between CVM 440 and the disk 504 is not local, and thus may be less efficient than local communication such as may occur between the CVM 440 and a disk 506 in local storage 452 of host machine 416. Further, a user VM 430 on host machine 416 may access data such as the virtual disk image 512 stored on a remote (e.g., non-local) disk 504 via network communication with a CVM 438 located on the remote host machine 408. This case may occur if CVM 440 is not present on host machine 416, e.g., because CVM 440 has failed, or if the FSVM 420 has been configured to communicate with 450 on host machine 408 via the CVM 438 on host machine 408, e.g., to reduce computational load on host machine 416.

In particular embodiments, since local communication is expected to be more efficient than remote communication, the FSVMs may store storage items, such as files or folders, e.g., the virtual disk images, as block-level data on local storage of the host machine on which the user VM that is expected to access the files is located. A user VM may be expected to access particular storage items if, for example, the storage items are associated with the user VM, such as by configuration information. For example, the virtual disk image 510 may be associated with the user VM 414 by configuration information of the user VM 414. Storage items may also be associated with a user VM via the identity of a user of the user VM. For example, files and folders owned by the same user ID as the user who is logged into the user VM 414 may be associated with the user VM 414. If the storage items expected to be accessed by a user VM 414 are not stored on the same host machine 402 as the user VM 414, e.g., because of insufficient available storage capacity in local storage 448 of the host machine 402, or because the storage items are expected to be accessed to a greater degree (e.g., more frequently or by more users) by a user VM 422 on a different host machine 408, then the user VM 414 may still communicate with a local CVM 436 to access the storage items located on the remote host machine 408, and the local CVM 436 may communicate with local storage 450 on the remote host machine 408 to access the storage items located on the remote host machine 408. If the user VM 414 on a host machine 402 does not or cannot use a local CVM 436 to access the storage items located on the remote host machine 408, e.g., because the local CVM 436 has crashed or the user VM 414 has been configured to use a remote CVM 438, then communication between the user VM 414 and local storage 450 on which the storage items are stored may be via a remote CVM 438 using the network 454, and the remote CVM 438 may access local storage 450 using local communication on host machine 408. As another example, a user VM 414 on a host machine 402 may access storage items located on a disk 506 of local storage 452 on another host machine 416 via a CVM 438 on an intermediary host machine 408 using network communication between the host machines 402 and 408 and between host machines 408 and 416.

Figure 6:
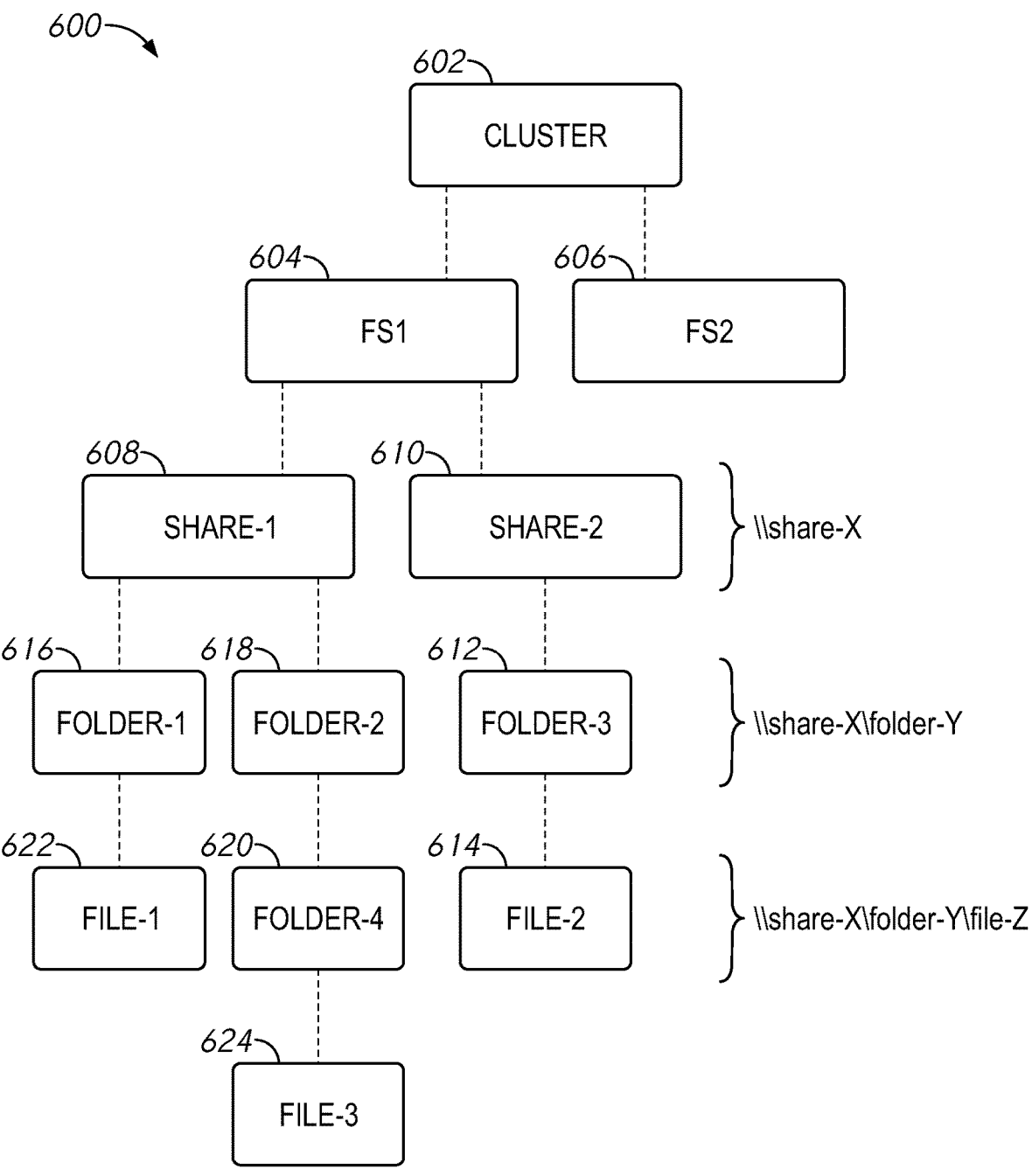
FIG. 6 illustrates an example hierarchical structure of a virtual file server (VFS) instance in a cluster, arranged in accordance with examples described herein.

FIG. 6 illustrates an example hierarchical structure of a VFS instance (e.g., a file system) in a cluster (such as a virtualized file server) according to particular embodiments. A Cluster 602 contains two VFS instances, FS1 604 and FS2 606. For example, the 602 may be used to implement and/or may be implemented by a virtualized file server described herein, such as virtualized file server 202 and/or virtualized file server 210 of FIG. 2. Each VFS instance as shown in FIG. 6 may be identified by a name such as "\\instance," e.g., "\\FS1" for WINDOWS file systems, or a name such as "instance," e.g., "FS1" for UNIX-type file systems. The VFS instance FS1 604 contains shares, including Share-1 608 and Share-2 610. Shares may have names such as "Users" for a share that stores user home directories, or the like. Each share may have a path name such as \\FS1\Share-1 or \FS1\Users. As an example and not by way of limitation, a share may correspond to a disk partition or a pool of file system blocks on WINDOWS and UNIX-type file systems. As another example and not by way of limitation, a share may correspond to a folder or directory on a VFS instance. Shares may appear in the file system instance as folders or directories to users of user VMs. Share-1 608 includes two folders, Folder-1 616, and Folder-2 618, and may also include one or more files (e.g., files not in folders). Each folder 616 and 618 may include one or more files 622 and 624. Share-2 610 includes a folder Folder-3 612, which includes a file File-2 614. Each folder has a folder name such as "Folder-1," "Users," or "Sam" and a path name such as "\\FS1\Share-1\Folder-1" (WINDOWS) or "share-1:/fs1/Users/Sam" (UNIX). Similarly, each file has a file name such as "File-1" or "Forecast.xls" and a path name such as "\\FS1\Share-1\Folder-1\File-1" or "share-1:/fs1/Users/Sam/Forecast.xls."

Figure 7:
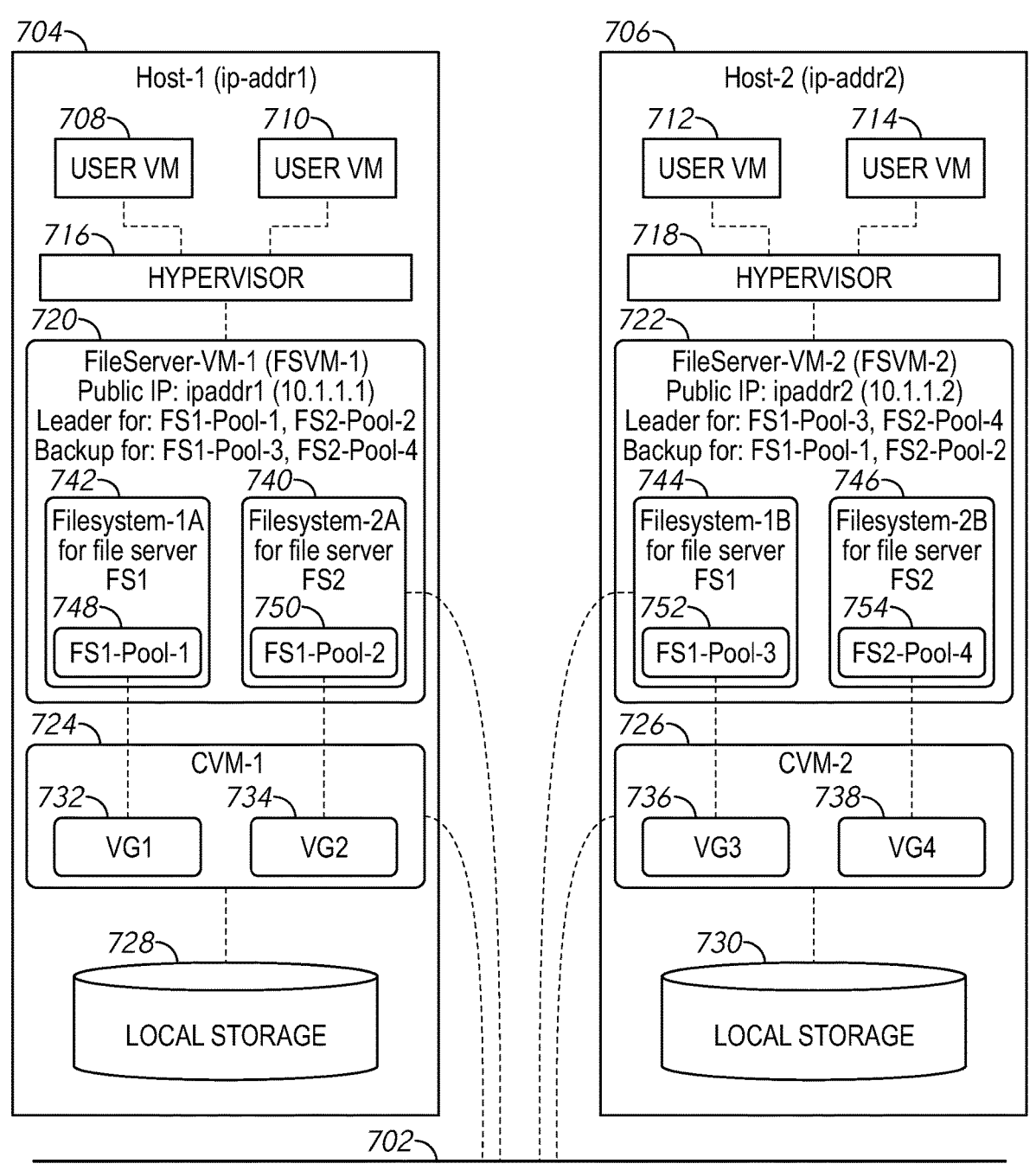
FIG. 7 illustrates two example host machines, each providing file storage services for portions of two VFS instances FS1 and FS2, arranged in accordance with examples described herein.

FIG. 7 illustrates two example host machines 704 and 706, each providing file storage services for portions of two VFS instances FS1 and FS2 according to particular embodiments. The first host machine, Host-1 402, includes two user VMs 708 and 710, a hypervisor 716, a FSVM named FileServer-VM-1 (abbreviated FSVM-1) 720, a controller/service VM named CVM-1 724, and local storage 728. Host-1's FileServer-VM-1 720 has an IP (Internet Protocol) network address of 10.1.1.1, which is an address of a network interface on Host-1 704. Host-1 has a hostname ip-addr1, which may correspond to Host-1's IP address 10.1.1.1. The second host machine, Host-2 706, includes two user VMs 712 and 714, a hypervisor 718, a File Server VM named FileServer-VM-2 (abbreviated FSVM-2) 722, a controller/service VM named CVM-2 726, and local storage 730. Host-2's FileServer-VM-2 722 has an IP network address of 10.1.1.2, which is an address of a network interface on Host-2 706.

In particular embodiments, file systems FileSystem-1A 742 and FileSystem-2A 740 implement the structure of files and folders for portions of the FS1 and FS2 file server instances, respectively, that are located on (e.g., served by) FileServer-VM-1 720 on Host-1 704. Other file systems on other host machines may implement other portions of the FS1 and FS2 file server instances. The file systems 742 and 740 may implement the structure of at least a portion of a file server instance by translating file system operations, such as opening a file, writing data to or reading data from the file, deleting a file, and so on, to disk I/O operations such as seeking to read/write to a portion of the disk, reading or writing an index of file information, writing data to or reading data from blocks of the disk, allocating or de-allocating the blocks, and so on. The file systems 742 and 740 may thus store their file system data, including the structure of the folder and file hierarchy, the names of the storage items (e.g., folders and files), and the contents of the storage items on one or more storage devices, such as local storage 728. The particular storage device or devices on which the file system data for each file system are stored may be specified by an associated file system pool (e.g., 748 and 750). For example, the storage device(s) on which data for FileSystem-1A 742 and FileSystem-2A 740 are stored may be specified by respective file system pools FS1-Pool-1 748 and FS2-Pool-2 750. The storage devices for the pool may be selected from volume groups provided by CVM-1 724, such as volume group VG1 732 and volume group VG2 734. Each volume group 732 and 734 may include a group of one or more available storage devices that are present in local storage 728 associated with (e.g., by iSCSI communication) the CVM-1 724. The CVM-1 724 may be associated with a local storage 728 on the same host machine 402 as the CVM-1 724, or with a local storage 730 on a different host machine 706. The CVM-1 724 may also be associated with other types of storage, such as cloud storage, networked storage, or the like. Although the examples described herein include particular host machines, virtual machines, file servers, file server instances, file server pools, CVMs, volume groups, and associations there between, any number of host machines, virtual machines, file servers, file server instances, file server pools, CVMs, volume groups, and any associations there between are possible and contemplated.

In particular embodiments, the file system pool 748 may associate any storage device in one of the volume groups 732 and 734 of storage devices that are available in local storage 728 with the file system FileSystem-1A 742. For example, the file system pool FS1-Pool-1 748 may specify that a disk device named hd1 in the volume group VG1 732 of local storage 728 is a storage device for FileSystem-1A 742 for file server FS1 on FSVM-1 720. A file system pool FS2-Pool-2 750 may specify a storage device FileSystem-2A 740 for file server FS2 on FSVM-1 720. The storage device for FileSystem-2A 740 may be, e.g., the disk device hd1, or a different device in one of the volume groups 732 and 734, such as a disk device named hd2 in volume group VG2 734. Each of the file systems FileSystem-1A 742 and FileSystem-2A 740 may be, e.g., an instance of the NTFS file system used by the WINDOWS operating system, of the UFS Unix file system, or the like. The term "file system" may also be used herein to refer to an instance of a type of file system, e.g., a particular structure of folders and files with particular names and content.

In one example, referring to FIG. 6 and FIG. 7, an FS1 hierarchy rooted at File Server FS1 604 may be located on FileServer-VM-1 720 and stored in file system instance FileSystem-1A 742. That is, the file system instance File-System-1A 742 may store the names of the shares and storage items (such as folders and files), as well as the contents of the storage items, shown in the hierarchy at and below File Server FS1 604. A portion of the FS1 hierarchy shown in FIG. 6, such as the portion rooted at Folder-2 618, may be located on FileServer-VM-2 722 on Host-2 706 instead of FileServer-VM-1 720, in which case the file system instance FileSystem-1B 744 may store the portion of the FS1 hierarchy rooted at Folder-2 618, including Folder-3 612, Folder-4 620, and File-3 624. Similarly, an FS2 hierarchy rooted at File Server FS2 606 in FIG. 6 may be located on FileServer-VM-1 720 and stored in file system instance FileSystem-2A 740. The FS2 hierarchy may be split into multiple portions (not shown), such that one portion is located on FileServer-VM-1 720 on Host-1 704, and another portion is located on FileServer-VM-2 722 on Host-2 706 and stored in file system instance FileSystem-2B 746.

In particular embodiments, FileServer-VM-1 (abbreviated FSVM-1) 720 on Host-1 704 is a leader for a portion of file server instance FS1 and a portion of FS2, and is a backup for another portion of FS1 and another portion of FS2. The portion of FS1 for which FileServer-VM-1 720 is a leader corresponds to a storage pool labeled FS1-Pool-1 748. FileServer-VM-1 is also a leader for FS2-Pool-2 750, and is a backup (e.g., is prepared to become a leader upon request, such as in response to a failure of another FSVM) for FS1-Pool-3 752 and FS2-Pool-4 754 on Host-2 706. In particular embodiments, FileServer-VM-2 (abbreviated FSVM-2) 722 is a leader for a portion of file server instance FS1 and a portion of FS2, and is a backup for another portion of FS1 and another portion of FS2. The portion of FS1 for which FSVM-2 722 is a leader corresponds to a storage pool labeled FS1-Pool-3 752. FSVM-2 722 is also a leader for FS2-Pool-4 754, and is a backup for FS1-Pool-1 748 and FS2-Pool-2 750 on Host-1 704.

In particular embodiments, the file server instances FS1 and FS2 provided by the FSVMs 720 and 722 may be accessed by user VMs 708, 710, 712 and 714 via a network file system protocol such as SMB, CIFS, NFS, or the like. Each of FSVM 720 and 722 may provide what appears to client applications on user VMs 708, 710, 712 and 714 to be a single file system instance, e.g., a single namespace of shares, files, and folders, for each file server instance. However, the shares, files, and folders in a file server instance such as FS1 may actually be distributed across multiple FSVMs 720 and 722. For example, different folders in the same file server instance may be associated with different corresponding FSVMs 720 and 722 and CVMs 724 and 726 on different host machines 704 and 706.

The example file server instance FS1 604 shown in FIG. 6 has two shares, Share-1 608 and Share-2 610. Share-1 608 may be located on FSVM-1 720, CVM-1 724, and local storage 728. Network file system protocol requests from user VMs to read or write data on file server instance FS1 604 and any share, folder, or file in the instance may be sent to FSVM-1 720. FSVM-1 720 (or another component, such as a hypervisor in some examples) may determine whether the requested data, e.g., the share, folder, file, or a portion thereof, referenced in the request, is located on FSVM-1, and FSVM-1 is a leader for the requested data. If not, FSVM-1 may respond to the requesting user VM with an indication that the requested data is not covered by (e.g., is not located on or served by) FSVM-1. Otherwise, the requested data is covered by (e.g., is located on or served by) FSVM-1, so FSVM-1 may send iSCSI protocol requests to a CVM that is associated with the requested data. Note that the CVM associated with the requested data may be the CVM-1 724 on the same host machine 402 as the FSVM-1, or a different CVM on a different host machine 706, depending on the configuration of the VFS. In this example, the requested Share-1 is located on FSVM-1, so FSVM-1 processes the request. To provide for path availability, multipath I/O (MPIO) may be used for communication with the FSVM, e.g., for communication between FSVM-1 and CVM-1. The active path may be set to the CVM that is local to the FSVM (e.g., on the same host machine) by default. The active path may be set to a remote CVM instead of the local CVM, e.g., when a failover occurs.

Continuing with the data request example, the associated CVM is CVM 724, which may in turn access the storage device associated with the requested data as specified in the request, e.g., to write specified data to the storage device or read requested data from a specified location on the storage device. In this example, the associated storage device is in local storage 728, and may be an HDD or SSD. CVM-1 724 may access the HDD or SSD via an appropriate protocol, e.g., iSCSI, SCSI, SATA, or the like. CVM 110a may send the results of accessing local storage 728, e.g., data that has been read, or the status of a data write operation, to CVM 724 via, e.g., SATA, which may in turn send the results to FSVM-1 720 via, e.g., iSCSI. FSVM-1 720 may then send the results to user VM via SMB through the hypervisor 716.

Share-2 610 may be located on FSVM-2 722, on Host-2. Network file service protocol requests from user VMs to read or write data on Share-2 may be directed to FSVM-2 722 on Host-2 by other FSVMs. Alternatively, user VMs may send such requests directly to FSVM-2 722 on Host-2, which may process the requests using CVM-2 726 and local storage 730 on Host-2 as described above for FSVM-1 720 on Host-1.

A file server instance such as FS1 604 in FIG. 6 may appear as a single file system instance (e.g., a single namespace of folders and files that are accessible by their names or pathnames without regard for their physical locations), even though portions of the file system are stored on different host machines. Since each FSVM may provide a portion of a file server instance, each FSVM may have one or more "local" file systems that provide the portion of the file server instance (e.g., the portion of the namespace of files and folders) associated with the FSVM.

Figure 8:
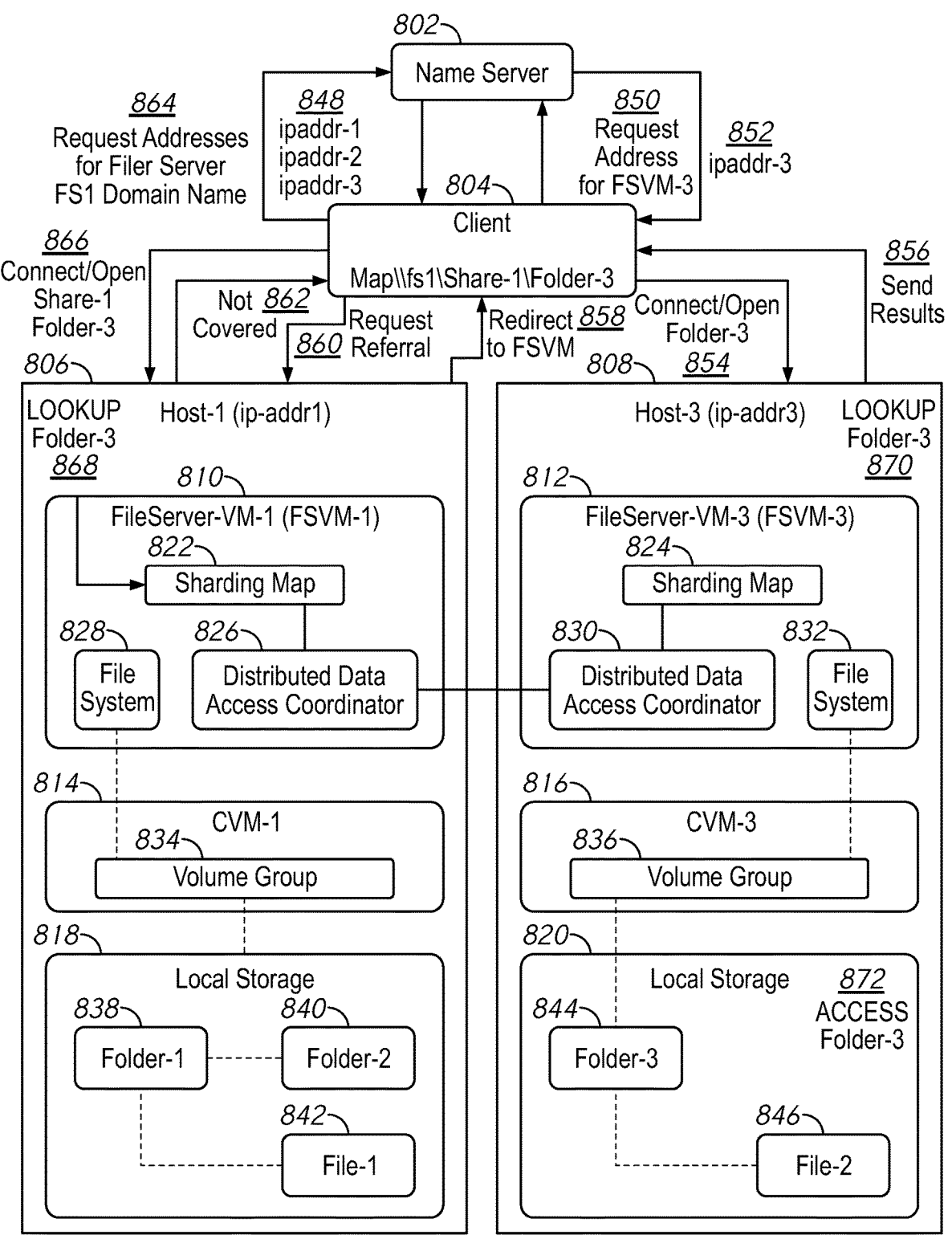
FIG. 8 illustrates example interactions between a client and host machines on which different portions of a VFS instance are stored, arranged in accordance with examples described herein.

FIG. 8 illustrates example interactions between a client 804 and host machines 806 and 808 on which different portions of a VFS instance are stored according to particular embodiments. A client 804, e.g., an application program executing in one of the user VMs and on the host machines of a virtualized file server described herein, requests access to a folder \\FS1.domain.name\Share-1\Folder-3. The request may be in response to an attempt to map \\FS1.domain.name\Share-1 to a network drive in the operating system executing in the user VM followed by an attempt to access the contents of Share-1 or to access the contents of Folder-3, such as listing the files in Folder-3.

FIG. 8 shows interactions that occur between the client 804, FSVMs 810 and 812 on host machines 806 and 808, and a name server 802 when a storage item is mapped or otherwise accessed. The name server 802 may be provided by a server computer system, such as one or more of the host machines 806 and 808 or a server computer system separate from the host machines 806 and 808. In one example, the name server 802 may be provided by an Active Directory service executing on one or more computer systems and accessible via the network. The interactions are shown as arrows that represent communications, e.g., messages sent via the network. Note that the client 804 may be executing in a user VM, which may be co-located with one of the FSVMs 810 and 812. In such a co-located case, the arrows between the client 804 and the host machine on which the FSVM is located may represent communication within the host machine, and such intra-host machine communication may be performed using a mechanism different from communication over the network, e.g., shared memory or inter-process communication.

In particular embodiments, when the client 804 requests access to Folder-3, a VFS client component executing in the user VM may use a distributed file system protocol such as MICROSOFT DFS, or the like, to send the storage access request to one or more FSVMs, such as of FIGS. 1, 4, 5, 7, and/or 8. To access the requested file or folder, the client determines the location of the requested file or folder, e.g., the identity and/or network address of the FSVM on which the file or folder is located. The client may query a domain cache of FSVM network addresses that the client has previously identified (e.g., looked up). If the domain cache contains the network address of an FSVM associated with the requested folder name \FS1.domain.name\Share-1\Folder-3, then the client retrieves the associated network address from the domain cache and sends the access request to the network address, starting at step 864 as described below.

In particular embodiments, at step 864, the client may send a request for a list of addresses of FSVMs to a name server 802. The name server 802 may be, e.g., a DNS server or other type of server, such as a MICROSOFT domain controller (not shown), that has a database of FSVM addresses. At step 848, the name server 802 may send a reply that contains a list of FSVM network addresses, e.g., ip-addr1, ip-addr2, and ip-addr3, which correspond to the FSVMs in this example. At step 866, the client 804 may send an access request to one of the network addresses, e.g., the first network address in the list (ip-addr1 in this example), requesting the contents of Folder-3 of Share-1. By selecting the first network address in the list, the particular FSVM to which the access request is sent may be varied, e.g., in a round-robin manner by enabling round-robin DNS (or the like) on the name server 802. The access request may be, e.g., an SMB connect request, an NFS open request, and/or appropriate request(s) to traverse the hierarchy of Share-1 to reach the desired folder or file, e.g., Folder-3 in this example.

At step 868, FileServer-VM-1 810 may process the request received at step 866 by searching a mapping or lookup table, such as a sharding map 822, for the desired folder or file. The map 822 maps stored objects, such as shares, folders, or files, to their corresponding locations, e.g., the names or addresses of FSVMs. The map 822 may have the same contents on each host machine, with the contents on different host machines being synchronized using a distributed data store as described below. For example, the map 822 may contain entries that map Share-1 and Folder-1 to the File Server FSVM-1 810, and Folder-3 to the File Server FSVM-3 812. An example map is shown in Table 1 below. While the example of FIG. 8 is depicted and described with respect to the FSVM processing the request, in some examples, one or more other components of a virtualized system may additionally or instead process the request (e.g., a CVM and/or a hypervisor).

| Stored Object | Location |
| --- | --- |
| Folder-1 | FSVM-1 |
| Folder-2 | FSVM-1 |
| File-1 | FSVM-1 |
| Folder-3 | FSVM-3 |
| File-2 | FSVM-3 |

In particular embodiments, the map 822 or 824 may be accessible on each of the host machines. The maps may be copies of a distributed data structure that are maintained and accessed at each FSVM using a distributed data access coordinator 826 and 830. The distributed data access coordinator 826 and 830 may be implemented based on distributed locks or other storage item access operations. Alternatively, the distributed data access coordinator 826 and 830 may be implemented by maintaining a master copy of the maps 822 and 824 at a leader node such as the host machine 808, and using distributed locks to access the master copy from each FSVM 810 and 812. The distributed data access coordinator 826 and 830 may be implemented using distributed locking, leader election, or related features provided by a centralized coordination service for maintaining configuration information, naming, providing distributed synchronization, and/or providing group services (e.g., APACHE ZOOKEEPER or other distributed coordination software). Since the map 822 indicates that Folder-3 is located at FSVM-3 812 on Host-3 808, the lookup operation at step 868 determines that Folder-3 is not located at FSVM-1 on Host-1 806. Thus, at step 862 the FSVM-1 810 (or other component of the virtualized system) sends a response, e.g., a "Not Covered" DFS response, to the client 804 indicating that the requested folder is not located at FSVM-1. At step 860, the client 804 sends a request to FSVM-1 for a referral to the FSVM on which Folder-3 is located. FSVM-1 uses the map 822 to determine that Folder-3 is located at FSVM-3 on Host-3 808, and at step 858 returns a response, e.g., a "Redirect" DFS response, redirecting the client 804 to FSVM-3. The client 804 may then determine the network address for FSVM-3, which is ip-addr3 (e.g., a host name "ip-addr3.domain.name" or an IP address, 10.1.1.3). The client 804 may determine the network address for FSVM-3 by searching a cache stored in memory of the client 804, which may contain a mapping from FSVM-3 to ip-addr3 cached in a previous operation. If the cache does not contain a network address for FSVM-3, then at step 850 the client 804 may send a request to the name server 802 to resolve the name FSVM-3. The name server may respond with the resolved address, ip-addr3, at step 852. The client 804 may then store the association between FSVM-3 and ip-addr3 in the client's cache.

In particular embodiments, failure of FSVMs may be detected using the centralized coordination service. For example, using the centralized coordination service, each FSVM may create a lock on the host machine on which the FSVM is located using ephemeral nodes of the centralized coordination service (which are different from host machines but may correspond to host machines). Other FSVMs may volunteer for leadership of resources of remote FSVMs on other host machines, e.g., by requesting a lock on the other host machines. The locks requested by the other nodes are not granted unless communication to the leader host machine is lost, in which case the centralized coordination service deletes the ephemeral node and grants the lock to one of the volunteer host machines, which becomes the new leader. For example, the volunteer host machines may be ordered by the time at which the centralized coordination service received their requests, and the lock may be granted to the first host machine on the ordered list. The first host machine on the list may thus be selected as the new leader. The FSVM on the new leader has ownership of the resources that were associated with the failed leader FSVM until the failed leader FSVM is restored, at which point the restored FSVM may reclaim the local resources of the host machine on which it is located.

At step 854, the client 804 may send an access request to FSVM-3 812 at ip-addr3 on Host-3 808 requesting the contents of Folder-3 of Share-1. At step 870, FSVM-3 812 queries FSVM-3's copy of the map 824 using FSVM-3's instance of the distributed data access coordinator 830. The map 824 indicates that Folder-3 is located on FSVM-3, so at step 872 FSVM-3 accesses the file system 832 to retrieve information about Folder-3 844 and its contents (e.g., a list of files in the folder, which includes File-2 846) that are stored on the local storage 820. FSVM-3 may access local storage 820 via CVM-3 816, which provides access to local storage 820 via a volume group 836 that contains one or more volumes stored on one or more storage devices in local storage 820. At step 856, FSVM-3 may then send the information about Folder-3 and its contents to the client 804. Optionally, FSVM-3 may retrieve the contents of File-2 and send them to the client 804, or the client 804 may send a subsequent request to retrieve File-2 as needed.

Figure 9:
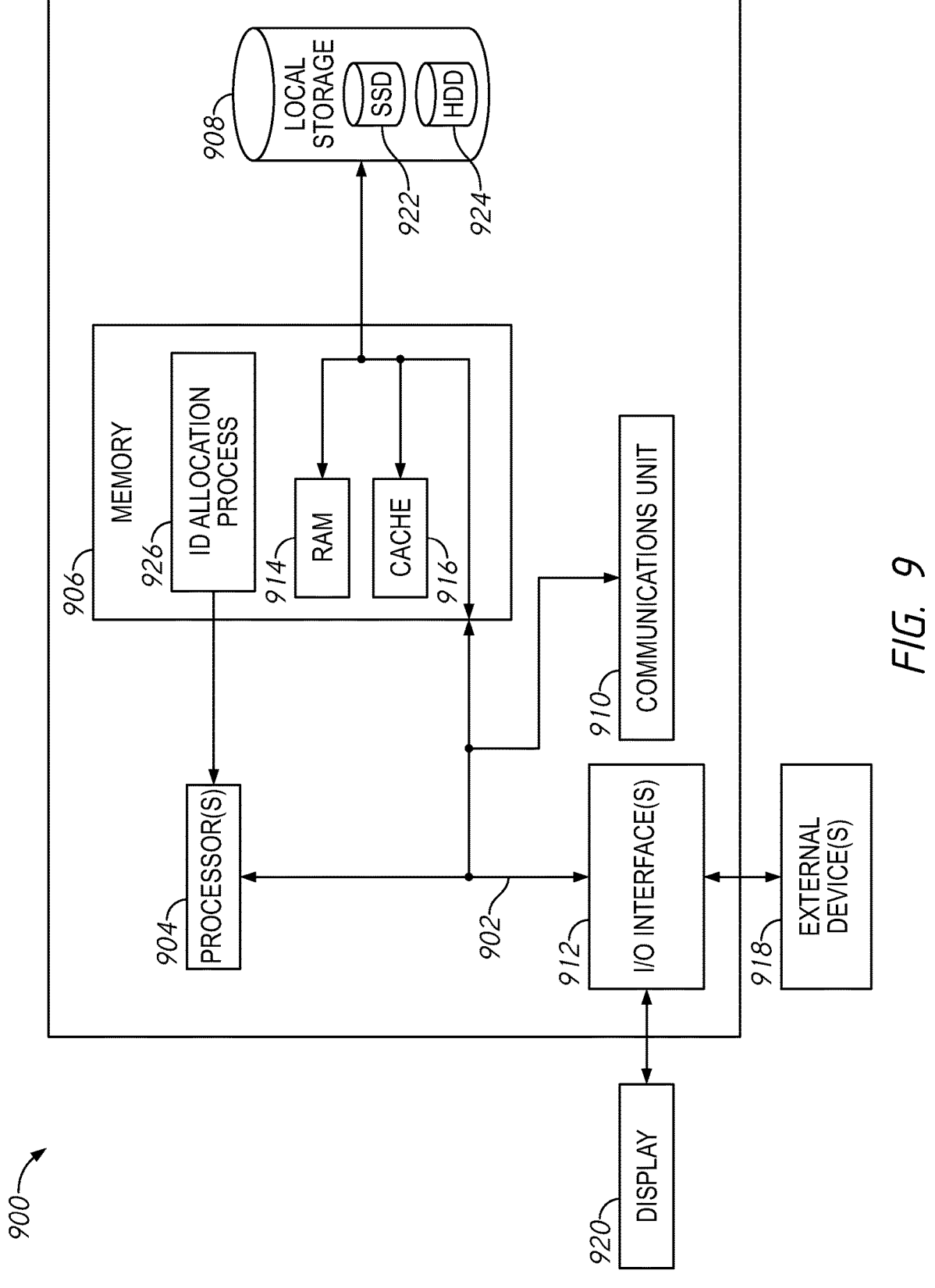
FIG. 9 is a schematic illustration of a computing system, arranged in accordance with examples described herein.

Turning now to FIG. 9, FIG. 9 is a schematic illustration of a computing system in accordance with examples described herein. It should be appreciated that FIG. 9 provides only an illustration of one implementation and does not imply any limitations with regard to the environments in which different embodiments may be implemented. Many modifications to the depicted environment may be made. The computing system may be used to implement and/or may be implemented by the virtualized file server 106 of FIG. 1 and or one or more of the systems as described herein. The components shown in FIG. 9 are exemplary only, and it is to be understood that additional, fewer, and/or different components may be used in other examples.

The computing node 900 includes one or more communications fabric(s) 902, which provide communications between one or more processor(s) 904, memory 906, local storage 908, communications unit 910, and/or I/O interface(s) 912. The communications fabric(s) 902 can be implemented with any architecture designed for passing data and/or control information between processors (such as microprocessors, communications and network processors, etc.), system memory, peripheral devices, and any other hardware components within a system. For example, the communications fabric(s) 902 can be implemented with one or more buses.

The memory 906 and the local storage 908 may be computer-readable storage media. In the example of FIG. 9, the memory 906 includes random access memory RAM 914 and cache 916. In general, the memory 906 can include any suitable volatile or non-volatile computer-readable storage media. In this embodiment, the local storage 908 includes an SSD 922 and an HDD 924. The memory 906 may include executable instructions for performing operations described herein. The instructions may be used to generate, allocate, and map file server user IDs to domains and local users, respectively. Memory 906 may include executable instructions for an ID allocation process, such as ID allocation process 926 (which may be used to implement ID allocator 114 of virtualized file server 106 of FIG. 1). The memory 906 may include executable instructions for implementing one or more FSVMs, such as FSVM 108 and/or FSVM 110 of FIG. 1.

Various computer instructions, programs, files, images, etc. may be stored in local storage 908 and/or memory 906 for execution by one or more of the respective processor(s) 904 via one or more memories of memory 906. In some examples, local storage 908 includes a magnetic HDD 924. Alternatively, or in addition to a magnetic hard disk drive, local storage 908 can include the SSD 922, a semiconductor storage device, a read-only memory (ROM), an erasable programmable read-only memory (EPROM), a flash memory, or any other computer-readable storage media that is capable of storing program instructions or digital information.

The media used by local storage 908 may also be removable. For example, a removable hard drive may be used for local storage 908. Other examples include optical and magnetic disks, thumb drives, and smart cards that are inserted into a drive for transfer onto another computer-readable storage medium that is also part of local storage 908.

Communications unit 910, in some examples, provides for communications with other data processing systems or devices. For example, communications unit 910 may include one or more network interface cards. Communications unit 910 may provide communications through the use of either or both physical and wireless communications links.

I/O interface(s) 912 may allow for input and output of data with other devices that may be connected to computing node 900. For example, I/O interface(s) 912 may provide a connection to external device(s) 918 such as a keyboard, a keypad, a touch screen, and/or some other suitable input device. External device(s) 918 can also include portable computer-readable storage media such as, for example, thumb drives, portable optical or magnetic disks, and memory cards. Software and data used to practice embodiments of the present invention can be stored on such portable computer-readable storage media and can be loaded onto and/or encoded in memory 906 and/or local storage 908 via I/O interface(s) 912 in some examples. I/O interface(s) 912 may connect to a display 920.

Display 920 may provide a mechanism to display data to a user and may be, for example, a computer monitor.

Various features described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media include both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

From the foregoing it will be appreciated that, although specific embodiments have been described herein for purposes of illustration, various modifications may be made while remaining with the scope of the claimed technology.

What is claimed is:

1. A distributed file server comprising:
at least one processor;
non-transitory computer-readable storage media encoded with instructions which, when executed by the at least one processor, cause the file server manager to perform actions comprising:
scan a plurality of domains, including a domain the distributed file server is subscribed to and trusted domains of the plurality of domains;
identify a trusted domain of the plurality of domains, wherein the trusted domain is associated with one or more users, each of the one or more users having a respective security identifier;
allocate, to the trusted domain, a range of file server user identifiers (IDs);
store a mapping between security identifiers (SIDs) in the trusted domain, including each respective security identifier, to a respective file server user ID within the range of file server user IDs; and
provide the mapping to a replication target for the distributed file server.

2. The distributed file server of claim 1, wherein at least one domain serviced by the distributed file server.

3. The distributed file server of claim 1, wherein each file server user ID within the range of file server user IDs is a global identifier (GID).

4. The distributed file server of claim 1, wherein each SID associated with a respective user of the one or more users comprises a domain-specific portion and relative user identifier (RID) portion.

5. The distributed file server of claim 1, wherein the trusted domain is an active directory domain.

6. The distributed file server of claim 1, wherein the distributed file server is a virtualized file server.

7. The distributed file server of claim 1, wherein the replication target is a destination target, a disaster recovery target, or a combination thereof.

8. The distributed file server of claim 1, wherein providing the mapping to the replication target for the distributed file server occurs responsive to a failover event, a disaster recovery event, a replication event, or combinations thereof.

9. The distributed file server of claim 1, wherein the distributed file server is further configured to perform actions comprising:

determine that a number of SIDs associated with the trusted domain exceeds a number of file server user IDs allocated to the trusted domain in the range of file server user IDs;
dynamically allocate another range of file server user IDs to the trusted domain; and
store a mapping between the number of SIDs that exceed the number of file server user IDs allocated to the trusted domain, and the another range of file server user IDs.

10. The distributed file server of claim 9, wherein the another range of file server user IDs is dynamically added to the trusted domain on a per-file share basis.

11. The distributed file server of claim 9, wherein the another range of file server user IDs is dynamically added to the trusted domain on a per-file server basis.

12. The distributed file server of claim 9, wherein the mapping between the number of SIDs that exceed the number of file server user IDs allocated to the trusted domain, and the another range of file server user IDs, the mapping between security identifiers in the trusted domain, including each respective security identifier, to a respective file server user ID within the range of file server user IDs, or a combination thereof, are accessible to each trusted domain.

13. The distributed file server of claim 1, wherein the distributed file server is further configured to perform actions comprising:
assign a file server user ID included in the range of file server user IDs to a user of the one or more users of the trusted domain, wherein the user is associated with an assigned SID of the SIDs, and wherein the assigned SID comprises a trusted domain-specific portion and a relative identifier (RID) specific portion.

14. A method comprising:
scanning one or more domains, including a domain a distributed file server is subscribed to and trusted domains of the one or more domains;
allocating a range of file server user identifier (IDs) to each of the one or more domains;
storing a mapping between security identifiers (SIDs) in each domain of the one or more domains to a respective file server user ID within each respective range of file server user IDs; and
providing the mapping to a replication target for the distributed file server.

15. The method of claim 14, wherein at least one of the one or more domains is an active directory domain.

16. The method of claim 14, wherein each of the one or more domains is a trusted domain.

17. The method of claim 14, wherein each file server user identifier of the file server user IDs is a global identifier (GID).

18. The method of claim 16, wherein each trusted domain is an active directory domain.

19. The method of claim 14, wherein the distributed file server is a virtualized file server.

20. The method of claim 14, wherein the replication target is a destination target, a disaster recovery target, or a combination thereof.

21. The method of claim 14, wherein providing the mapping to the replication target occurs responsive to a failover event, a disaster recovery event, a replication event, or combinations thereof.

22. The method of claim 14, the method further comprising:

determining that a number of SIDs associated with a first domain of the one or more domains exceeds a number of file server user IDs allocated to the first domain in a first range;

dynamically allocating another range of file server user IDs to the first domain; and storing another mapping between the SIDs that exceed the number of file server user IDs allocated to the first domain, and the another range of file server user IDs.

23. The method of claim 22, wherein the mapping between SIDs in each domain of the one or more domains, the another mapping between the SIDs that exceed the number of file server user IDs allocated to the first domain, and the another range of file server user IDs, or a combination thereof, are accessible to each trusted domain.

24. The method of claim 14, the method further comprising:

assigning to a first user of a first domain of the one or more domains, a file server user ID, wherein the first user is associated with an assigned SID, including a domain-specific portion and a relative identifier (RID) specific portion.

25. At least one non-transitory computer-readable storage medium encoded with instructions which, when executed, cause a computing node to perform operations, the operations comprising:

scanning one or more domains, including a domain a distributed file server is subscribed to and trusted domains of the one or more domains;

determining at least one domain of the one or more domains scanned is a trusted domain;

allocating a range of global identifiers (GIDs) to the trusted domain;

storing a mapping between security identifiers (SIDs) in the trusted domain to a respective GID within the range of GIDs; and providing the mapping to a replication target for the distributed file server.

26. The non-transitory computer-readable storage medium of claim 25, wherein the GID is a file server user identifier (ID).

27. The non-transitory computer-readable storage medium of claim 25, wherein the one or more domains are active directory domains.

28. The non-transitory computer-readable storage medium of claim 25, wherein the trusted domain is an active directory domain.

29. The non-transitory computer-readable storage medium of claim 25, wherein the distributed file server is a virtualized file server.

30. The non-transitory computer-readable storage medium of claim 25, wherein the replication target is a destination target, a disaster recovery target, or a combination thereof.

31. The non-transitory computer-readable storage medium of claim 25, wherein providing the mapping to the replication target occurs responsive to a failover event, a disaster recovery event, a replication event, or combinations thereof.

32. The non-transitory computer-readable storage medium of claim 25, the operations further comprising:

determining a number of SIDs associated with the trusted domain exceeds a number of GIDs allocated to the trusted domain within the range of GIDS;

allocating another range of GIDs to the trusted domain; and storing another mapping between the SIDs that exceed the number of GIDs allocated to the trusted domain and the another range of GIDs.

33. The non-transitory computer-readable storage medium of claim 32, the operations further comprising:

scanning the one or more domains;

determining a second domain of the one or more domains is a second trusted domain, the second trusted domain subscribed to by the distributed file server;

allocating a second range of GIDs to the second trusted domain, wherein the second range of GIDs is different from the range of GIDs allocated to the trusted domain and the another range of GIDs allocated to the trusted domain;

storing a second mapping between SIDs in the second trusted domain to a respective GID within the second range of GIDs; and providing the second mapping to a second replication target for the distributed file server.

34. The non-transitory computer-readable storage medium of claim 33, wherein the mapping between SIDs in the trusted domain to a respective GID within the range of GIDs, the another mapping between the SIDs that exceed the number of GIDs allocated to the trusted domain, the second mapping between SIDs in the second trusted domain to a respective GID within the second range of GIDs, or combinations thereof, are accessible to each trusted domain.

35. The non-transitory computer-readable storage medium of claim 25, the operations further comprising:

assigning, to a user of the trusted domain, a first GID within the range of GIDs allocated to the trusted domain, wherein the user is associated with an assigned SID, including a domain-specific portion and a relative identifier (RID) specific portion.

* * * * *